United States Patent
Chen et al.

(10) Patent No.: US 9,366,846 B2
(45) Date of Patent: Jun. 14, 2016

(54) IMAGING LENS, AND ELECTRONIC APPARATUS INCLUDING THE SAME

(71) Applicant: Genius Electronic Optical Co., Ltd., Central Taiwan Science Park (TW)

(72) Inventors: Shih-Han Chen, Central Taiwan Science Park (TW); Kailun Wang, Fujian (CN); Baina Chen, Fujian (CN)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/497,355

(22) Filed: Sep. 26, 2014

(65) Prior Publication Data

US 2015/0346459 A1 Dec. 3, 2015

(30) Foreign Application Priority Data

May 29, 2014 (CN) .......................... 2014 1 0234542

(51) Int. Cl.
- G02B 13/18 (2006.01)
- G02B 9/62 (2006.01)
- G02B 13/00 (2006.01)
- H04N 5/225 (2006.01)

(52) U.S. Cl.
CPC .............. *G02B 13/0045* (2013.01); *G02B 9/62* (2013.01); *H04N 5/2254* (2013.01)

(58) Field of Classification Search
CPC ............................... G02B 9/62; G02B 13/0045
USPC .................................. 359/713, 761, 708, 752
See application file for complete search history.

(56) References Cited

U.S. PATENT DOCUMENTS

| 8,385,006 | B2 | 2/2013 | Tsai et al. |
| 2013/0050846 | A1 | 2/2013 | Huang |
| 2014/0009844 | A1* | 1/2014 | Tsai ................... G02B 13/0045 359/713 |
| 2014/0118844 | A1* | 5/2014 | Tsai .......................... G02B 9/62 359/713 |
| 2015/0241659 | A1* | 8/2015 | Huang ............... G02B 13/0045 348/360 |

FOREIGN PATENT DOCUMENTS

| CN | 103076670 | 5/2013 |
| CN | 103792646 | 5/2014 |
| TW | 201243386 | 11/2012 |
| TW | 201303412 | 1/2013 |
| TW | 201314257 | 4/2013 |
| TW | 201403120 | 1/2014 |
| TW | 201418764 | 5/2014 |

OTHER PUBLICATIONS

Office Action from Taiwan Patent Application No. 103123971 dated Jul. 30, 2015.
Official Action from Chinese Patent Application No. 201410234542.5 dated Mar. 2, 2016.

* cited by examiner

*Primary Examiner* — William Choi

(74) *Attorney, Agent, or Firm* — Baker & McKenzie LLP

(57) ABSTRACT

An imaging lens includes first to sixth lens elements arranged from an object side to an image side in the given order. Through designs of surfaces of the lens elements and relevant optical parameters, a larger field of view and a shorter system length of the imaging lens may be achieved while maintaining good optical performance.

18 Claims, 37 Drawing Sheets

| system focal length =2.037mm , half field-of-view =70.00° , F-number =2.2, system length =3.6309mm |||||||
|---|---|---|---|---|---|---|
| lens element | surface | radius of curvature | thickness | refractive index | Abbe number | focal length | material |
| object | | ∞ | ∞ | | | | |
| first lens element 3 | object-side surface 31 | 43.8212 | 0.2200 | 1.640 | 23.529 | -39.349 | plastic |
| | image-side surface 32 | 16.0335 | 0.2799 | | | | |
| second lens element 4 | object-side surface 41 | -6.6719 | 0.3265 | 1.535 | 55.712 | 20.691 | plastic |
| | image-side surface 42 | -4.2394 | 0.1126 | | | | |
| aperture stop 2 | | ∞ | -0.0101 | | | | |
| third lens element 5 | object-side surface 51 | 2.4624 | 0.5237 | 1.544 | 56.114 | 1.410 | plastic |
| | image-side surface 52 | -1.0354 | 0.1333 | | | | |
| fourth lens element 6 | object-side surface 61 | -9.8111 | 0.2466 | 1.640 | 23.529 | -2.325 | plastic |
| | image-side surface 62 | 1.7863 | 0.0973 | | | | |
| fifth lens element 7 | object-side surface 71 | 3.2041 | 0.2473 | 1.535 | 55.712 | 11.558 | plastic |
| | image-side surface 72 | 6.4474 | 0.1289 | | | | |
| sixth lens element 8 | object-side surface 81 | 4.4995 | 0.5039 | 1.531 | 55.744 | -18.285 | plastic |
| | image-side surface 82 | 2.9582 | 0.2000 | | | | |
| optical filter 9 | object-side surface 91 | ∞ | 0.2100 | | | | |
| | image-side surface 92 | ∞ | 0.4109 | | | | |
| image plane 100 | | ∞ | | | | | |

FIG.3

| surface | 31 | 32 | 41 | 42 | 51 | 52 |
|---|---|---|---|---|---|---|
| K | 0 | 0 | 0 | 0 | 0 | 0 |
| a4 | -0.039993 | 0.191656 | 0.142721 | -0.061161 | -0.138361 | 0.260140 |
| a6 | -1.344398 | 0.058382 | -0.775454 | -0.733730 | 0.305699 | -0.529154 |
| a8 | 1.663769 | 0.072124 | 0.641742 | 1.873970 | -1.160408 | -0.257120 |
| a10 | -0.075242 | | | | 3.217314 | 0.820779 |
| a12 | -0.333306 | | | | | 4.365893 |
| a14 | | | | | | |
| a16 | | | | | | |
| surface | 61 | 62 | 71 | 72 | 81 | 82 |
| K | 0 | 0 | 0 | 0 | 0 | 0 |
| a4 | -0.039993 | -0.208709 | -0.042167 | 0.026413 | -0.083533 | -0.142666 |
| a6 | -1.344398 | -0.165789 | 0.046672 | -0.065660 | 2.30321E-02 | -1.10163E-02 |
| a8 | 1.663769 | 0.320218 | -0.099715 | 0.014763 | 1.06146E-02 | 1.00796E-02 |
| a10 | -0.075242 | -0.236796 | | | 2.38510E-03 | 2.49638E-03 |
| a12 | -0.333306 | | | | -8.25099E-05 | 5.62028E-04 |
| a14 | | | | | -1.25202E-03 | -2.59532E-07 |
| a16 | | | | | -5.65763E-04 | -4.97099E-05 |

FIG.4

| system focal length =2.031mm , half field-of-view =70.00°, F-number =2.2, system length =3.6041mm | | | | | | |
|---|---|---|---|---|---|---|
| lens element | surface | radius of curvature | thickness | refractive index | Abbe number | focal length | material |
| object | | ∞ | ∞ | | | | |
| first lens element 3 | object-side surface 31 | 35.0000 | 0.2200 | 1.640 | 23.529 | -50.916 | plastic |
| | image-side surface 32 | 16.8957 | 0.2290 | | | | |
| second lens element 4 | object-side surface 41 | -5.9638 | 0.3535 | 1.535 | 55.712 | 23.741 | plastic |
| | image-side surface 42 | -4.1467 | 0.0750 | | | | |
| aperture stop 2 | | ∞ | -0.0263 | | | | |
| third lens element 5 | object-side surface 51 | 2.4543 | 0.5548 | 1.544 | 56.114 | 1.407 | plastic |
| | image-side surface 52 | -1.0283 | 0.0808 | | | | |
| fourth lens element 6 | object-side surface 61 | -12.4151 | 0.2692 | 1.640 | 23.529 | -2.355 | plastic |
| | image-side surface 62 | 1.7442 | 0.0802 | | | | |
| fifth lens element 7 | object-side surface 71 | 2.8896 | 0.3478 | 1.535 | 55.712 | 10.952 | plastic |
| | image-side surface 72 | 5.4436 | 0.0836 | | | | |
| sixth lens element 8 | object-side surface 81 | 4.9121 | 0.5168 | 1.531 | 55.744 | -15.894 | plastic |
| | image-side surface 82 | 2.9953 | 0.2000 | | | | |
| optical filter 9 | object-side surface 91 | ∞ | 0.2100 | | | | |
| | image-side surface 92 | ∞ | 0.4098 | | | | |
| image plane 100 | | ∞ | | | | | |

FIG.7

| surface | 31 | 32 | 41 | 42 | 51 | 52 |
|---|---|---|---|---|---|---|
| K | 0 | 0 | 0 | 0 | 0 | 0 |
| a4 | -0.044032 | 0.219400 | 0.162405 | -0.099238 | -0.133953 | 0.270420 |
| a6 | -1.361903 | 0.082549 | -0.823925 | -0.823797 | 0.371823 | -0.500437 |
| a8 | 1.647387 | 0.107343 | 0.632786 | 2.507313 | -0.702806 | -0.189247 |
| a10 | -0.044612 |  |  |  | 3.717879 | 0.983585 |
| a12 | -0.071027 |  |  |  |  | 6.030657 |
| a14 |  |  |  |  |  |  |
| a16 |  |  |  |  |  |  |

| surface | 61 | 62 | 71 | 72 | 81 | 82 |
|---|---|---|---|---|---|---|
| K | 0 | 0 | 0 | 0 | 0 | 0 |
| a4 | -0.044032 | -0.204654 | -0.040338 | 0.028136 | -0.087582 | -0.138878 |
| a6 | -1.361903 | -0.161135 | 0.046032 | -0.066221 | 2.28655E-02 | -1.05725E-02 |
| a8 | 1.647387 | 0.320481 | -0.099415 | 0.014225 | 1.07376E-02 | 9.98571E-03 |
| a10 | -0.044612 | -0.241241 |  |  | 2.48020E-03 | 2.39784E-03 |
| a12 | -0.071027 |  |  |  | -3.04307E-05 | 5.05878E-04 |
| a14 |  |  |  |  | -1.22391E-03 | -2.66838E-05 |
| a16 |  |  |  |  | -5.48005E-04 | -6.24290E-05 |

FIG.8 system focal length =2.036mm, half field-of-view =70.00°, F-number =2.2, system length =3.8118mm

| lens element | surface | radius of curvature | thickness | refractive index | Abbe number | focal length | material |
|---|---|---|---|---|---|---|---|
| object | | ∞ | ∞ | | | | |
| first lens element 3 | object-side surface 31 | 26.2374 | 0.2176 | 1.640 | 23.529 | -199.271 | plastic |
| | image-side surface 32 | 21.7162 | 0.2539 | | | | |
| second lens element 4 | object-side surface 41 | -6.1055 | 0.4819 | 1.535 | 55.712 | 27.516 | plastic |
| | image-side surface 42 | -4.4390 | 0.1242 | | | | |
| aperture stop 2 | | ∞ | -0.0134 | | | | |
| third lens element 5 | object-side surface 51 | 2.2353 | 0.4856 | 1.544 | 56.114 | 1.392 | plastic |
| | image-side surface 52 | -1.0635 | 0.1139 | | | | |
| fourth lens element 6 | object-side surface 61 | -9.9522 | 0.2575 | 1.640 | 23.529 | -2.238 | plastic |
| | image-side surface 62 | 1.7039 | 0.0951 | | | | |
| fifth lens element 7 | object-side surface 71 | 2.6955 | 0.2820 | 1.535 | 55.712 | 12.013 | plastic |
| | image-side surface 72 | 4.4621 | 0.0994 | | | | |
| sixth lens element 8 | object-side surface 81 | 5.6817 | 0.6836 | 1.531 | 55.744 | -12.331 | plastic |
| | image-side surface 82 | 2.9195 | 0.2000 | | | | |
| optical filter 9 | object-side surface 91 | ∞ | 0.2100 | | | | |
| | image-side surface 92 | ∞ | 0.3205 | | | | |
| image plane 100 | | ∞ | | | | | |

FIG.11

| surface | 31 | 32 | 41 | 42 | 51 | 52 |
|---|---|---|---|---|---|---|
| K | 0 | 0 | 0 | 0 | 0 | 0 |
| a4 | -0.046614 | 0.183075 | 0.078430 | -0.097418 | -0.173889 | 0.268036 |
| a6 | -1.340494 | -0.015599 | -0.529876 | -0.561031 | 0.415215 | -0.541932 |
| a8 | 1.704731 | 0.043373 | 0.411968 | 1.881009 | -0.904760 | -0.301552 |
| a10 | -0.032646 | | | | 2.574327 | 1.442836 |
| a12 | -0.415067 | | | | | 4.009413 |
| a14 | | | | | | |
| a16 | | | | | | |

| surface | 61 | 62 | 71 | 72 | 81 | 82 |
|---|---|---|---|---|---|---|
| K | 0 | 0 | 0 | 0 | 0 | 0 |
| a4 | -0.225897 | -0.048979 | 0.021747 | -0.068748 | -0.138748 | |
| a6 | -0.155855 | 0.052616 | -0.062970 | 3.31822E-02 | -9.72903E-03 | |
| a8 | 0.314001 | -0.098575 | 0.015859 | 5.09664E-03 | 9.29742E-03 | |
| a10 | -0.245842 | | | 1.01632E-03 | 2.42098E-03 | |
| a12 | | | | -3.77533E-05 | 6.27278E-04 | |
| a14 | | | | 4.27700E-04 | 2.03822E-07 | |
| a16 | | | | -2.02623E-03 | -8.34345E-05 | |

FIG.12

| system focal length =1.983mm , half field-of-view =70.00° , F-number =2.2, system length =4.8654mm | | | | | | |
|---|---|---|---|---|---|---|
| lens element | surface | radius of curvature | thickness | refractive index | Abbe number | focal length | material |
| object | | ∞ | ∞ | | | | |
| first lens element 3 | object-side surface 31 | 35.0030 | 1.5018 | 1.640 | 23.529 | -70.801 | plastic |
| | image-side surface 32 | 19.4763 | 0.1725 | | | | |
| second lens element 4 | object-side surface 41 | -7.0103 | 0.3843 | 1.535 | 55.712 | 21.590 | plastic |
| | image-side surface 42 | -4.4517 | 0.1150 | | | | |
| aperture stop 2 | | ∞ | -0.0111 | | | | |
| third lens element 5 | object-side surface 51 | 2.4578 | 0.5441 | 1.544 | 56.114 | 1.381 | plastic |
| | image-side surface 52 | -1.0030 | 0.0905 | | | | |
| fourth lens element 6 | object-side surface 61 | -9.7788 | 0.3063 | 1.640 | 23.529 | -2.371 | plastic |
| | image-side surface 62 | 1.8340 | 0.0928 | | | | |
| fifth lens element 7 | object-side surface 71 | 3.0388 | 0.3216 | 1.535 | 55.712 | 11.747 | plastic |
| | image-side surface 72 | 5.6485 | 0.0993 | | | | |
| sixth lens element 8 | object-side surface 81 | 5.2659 | 0.5525 | 1.531 | 55.744 | -11.799 | plastic |
| | image-side surface 82 | 2.7611 | 0.2000 | | | | |
| optical filter 9 | object-side surface 91 | ∞ | 0.2100 | | | | |
| | image-side surface 92 | ∞ | 0.2858 | | | | |
| image plane 100 | | ∞ | | | | | |

FIG.15

| surface | 31 | 32 | 41 | 42 | 51 | 52 |
|---|---|---|---|---|---|---|
| K | 0 | 0 | 0 | 0 | 0 | 0 |
| a4 | -0.047184 | 0.238892 | 0.142565 | -0.060972 | -0.143457 | 0.257750 |
| a6 | -1.343655 | 0.076139 | -0.682454 | -0.926354 | 0.363931 | -0.530421 |
| a8 | 1.665881 | 0.071374 | 0.433459 | 2.054310 | -1.273071 | -0.154851 |
| a10 | -0.035720 | | | | 2.637731 | 0.598515 |
| a12 | -0.216054 | | | | | 4.699675 |
| a14 | | | | | | |
| a16 | | | | | | |
| surface | 61 | 62 | 71 | 72 | 81 | 82 |
| K | 0 | 0 | 0 | 0 | 0 | 0 |
| a4 | -0.206321 | -0.045843 | 0.025975 | -0.078311 | -0.143703 |
| a6 | -0.166537 | 0.045908 | -0.065077 | 2.38090E-02 | -1.02226E-02 |
| a8 | 0.319218 | -0.095119 | 0.015482 | 1.11429E-02 | 9.77483E-03 |
| a10 | -0.237881 | | | 2.72633E-03 | 2.53464E-03 |
| a12 | | | | -3.81298E-05 | 5.83067E-04 |
| a14 | | | | -1.41728E-03 | -1.31772E-05 |
| a16 | | | | -7.04285E-04 | -8.56258E-05 |

FIG.16 system focal length =1.917mm , half field-of-view =70.00°, F-number =2.2, system length =3.4691mm

| lens element | surface | radius of curvature | thickness | refractive index | Abbe number | focal length | material |
|---|---|---|---|---|---|---|---|
| object | | ∞ | ∞ | | | | |
| first lens element 3 | object-side surface 31 | 35.0000 | 0.2200 | 1.640 | 23.529 | -48.242 | plastic |
| | image-side surface 32 | 16.4259 | 0.2966 | | | | |
| second lens element 4 | object-side surface 41 | -6.9660 | 0.3227 | 1.535 | 55.712 | 18.377 | plastic |
| | image-side surface 42 | -4.1490 | 0.1024 | | | | |
| aperture stop 2 | | ∞ | -0.0153 | | | | |
| third lens element 5 | object-side surface 51 | 2.4191 | 0.5356 | 1.544 | 56.114 | 1.363 | plastic |
| | image-side surface 52 | -0.9909 | 0.1048 | | | | |
| fourth lens element 6 | object-side surface 61 | -12.7499 | 0.2407 | 1.640 | 23.529 | -2.397 | plastic |
| | image-side surface 62 | 1.7708 | 0.0936 | | | | |
| fifth lens element 7 | object-side surface 71 | 3.1658 | 0.3533 | 1.535 | 55.712 | 12.625 | plastic |
| | image-side surface 72 | 5.7096 | 0.1232 | | | | |
| sixth lens element 8 | object-side surface 81 | 4.3237 | 0.2965 | 1.531 | 55.744 | -18.680 | plastic |
| | image-side surface 82 | 2.9425 | 0.2000 | | | | |
| optical filter 9 | object-side surface 91 | ∞ | 0.2100 | | | | |
| | image-side surface 92 | ∞ | 0.3849 | | | | |
| image plane 100 | | ∞ | | | | | |

FIG.19

| surface | 31 | 32 | 41 | 42 | 51 | 52 |
|---|---|---|---|---|---|---|
| K | 0 | 0 | 0 | 0 | 0 | 0 |
| a4 | -0.044764 | 0.174318 | 0.150811 | -0.024842 | -0.120405 | 0.266065 |
| a6 | -1.334875 | 0.059937 | -0.746221 | -0.662459 | 0.279815 | -0.515750 |
| a8 | 1.690674 | 0.078514 | 0.644941 | 1.983726 | -1.099667 | -0.234288 |
| a10 | -0.038782 | | | | 2.528605 | -0.013549 |
| a12 | -0.473066 | | | | | 4.866143 |
| a14 | | | | | | |
| a16 | | | | | | |

| surface | 61 | 62 | 71 | 72 | 81 | 82 |
|---|---|---|---|---|---|---|
| K | 0 | 0 | 0 | 0 | 0 | 0 |
| a4 | -0.044764 | -0.205797 | -0.046535 | 0.033951 | -0.099892 | -0.139249 |
| a6 | -1.334875 | -0.163273 | 0.046670 | -0.064532 | 2.11939E-02 | -9.46472E-03 |
| a8 | 1.690674 | 0.320106 | -0.100916 | 0.014852 | 9.95011E-03 | 1.06561E-02 |
| a10 | -0.038782 | -0.238495 | | | 2.24944E-03 | 2.68928E-03 |
| a12 | -0.473066 | | | | -1.78401E-04 | 6.45491E-04 |
| a14 | | | | | -1.35320E-03 | 4.34049E-06 |
| a16 | | | | | -6.36558E-04 | -2.38311E-05 |

FIG.20

| system focal length =1.814mm , half field-of-view =70.00°, F-number =2.2, system length =3.2264mm |||||||
|---|---|---|---|---|---|---|
| lens element | surface | radius of curvature | thickness | refractive index | Abbe number | focal length | material |
| object | | ∞ | ∞ | | | | |
| first lens element 3 | object-side surface 31 | 35.0002 | 0.2050 | 1.640 | 23.529 | -120.557 | plastic |
| | image-side surface 32 | 24.0760 | 0.1241 | | | | |
| second lens element 4 | object-side surface 41 | -9.4806 | 0.4313 | 1.535 | 55.712 | 86.069 | plastic |
| | image-side surface 42 | -7.9914 | 0.0973 | | | | |
| aperture stop 2 | | ∞ | -0.0002 | | | | |
| third lens element 5 | object-side surface 51 | 2.5551 | 0.4977 | 1.544 | 56.114 | 1.292 | plastic |
| | image-side surface 52 | -0.9076 | 0.2004 | | | | |
| fourth lens element 6 | object-side surface 61 | -12.8468 | 0.2097 | 1.640 | 23.529 | -2.667 | plastic |
| | image-side surface 62 | 1.9976 | 0.0791 | | | | |
| fifth lens element 7 | object-side surface 71 | 3.0419 | 0.2097 | 1.535 | 55.712 | 10.203 | plastic |
| | image-side surface 72 | 6.6770 | 0.3701 | | | | |
| sixth lens element 8 | object-side surface 81 | 16.7380 | 0.2579 | 1.531 | 55.744 | -5.003 | plastic |
| | image-side surface 82 | 2.2872 | 0.2000 | | | | |
| optical filter 9 | object-side surface 91 | ∞ | 0.2100 | | | | |
| | image-side surface 92 | ∞ | 0.1342 | | | | |
| image plane 100 | | ∞ | | | | | |

FIG.23

| surface | 31 | 32 | 41 | 42 | 51 | 52 |
|---|---|---|---|---|---|---|
| K | 0 | 0 | 0 | 0 | 0 | 0 |
| a4 | -0.089920 | 0.341737 | 0.220298 | -0.034889 | -0.277729 | 0.223183 |
| a6 | -1.306040 | -0.036682 | -0.751081 | -1.013336 | 0.574785 | -0.664602 |
| a8 | 1.665124 | 0.166938 | 0.347049 | 3.600595 | -2.627164 | -0.017128 |
| a10 | -0.085853 | | | | 4.966087 | 2.323008 |
| a12 | -0.532967 | | | | | -0.592366 |
| a14 | | | | | | |
| a16 | | | | | | |

| surface | 61 | 62 | 71 | 72 | 81 | 82 |
|---|---|---|---|---|---|---|
| K | 0 | 0 | 0 | 0 | 0 | 0 |
| a4 | | -0.234403 | -0.067141 | 0.028252 | -0.096537 | -0.132101 |
| a6 | | -0.192792 | 0.051549 | -0.064221 | 2.33643E-02 | -2.04841E-02 |
| a8 | | 0.309909 | -0.097275 | 0.017436 | 1.16257E-02 | 7.33629E-03 |
| a10 | | -0.227471 | | | 2.23002E-03 | 1.93054E-03 |
| a12 | | | | | -3.13747E-04 | 5.12719E-04 |
| a14 | | | | | -1.35555E-03 | -3.60577E-05 |
| a16 | | | | | -5.87657E-04 | -4.57894E-05 |

FIG.24

| system focal length =2.112mm, half field-of-view =60.00°, F-number =2.4, system length =6.0468mm | | | | | | | |
|---|---|---|---|---|---|---|---|
| lens element | surface | radius of curvature | thickness | refractive index | Abbe number | focal length | material |
| object | | ∞ | ∞ | | | | |
| first lens element 3 | object-side surface 31 | 31.8810 | 2.4370 | 1.640 | 23.529 | -130.063 | plastic |
| | image-side surface 32 | 22.4056 | 0.1858 | | | | |
| second lens element 4 | object-side surface 41 | 47.3063 | 0.3154 | 1.535 | 55.712 | -39.067 | plastic |
| | image-side surface 42 | 14.4962 | 0.1997 | | | | |
| aperture stop 2 | | ∞ | 0.0042 | | | | |
| third lens element 5 | object-side surface 51 | 2.3799 | 0.5623 | 1.544 | 56.114 | 1.489 | plastic |
| | image-side surface 52 | -1.1321 | 0.0993 | | | | |
| fourth lens element 6 | object-side surface 61 | 64.6569 | 0.2552 | 1.640 | 23.529 | -2.463 | plastic |
| | image-side surface 62 | 1.5472 | 0.0916 | | | | |
| fifth lens element 7 | object-side surface 71 | 1.9739 | 0.5793 | 1.535 | 55.712 | 7.584 | plastic |
| | image-side surface 72 | 3.4389 | 0.1336 | | | | |
| sixth lens element 8 | object-side surface 81 | 3.8772 | 0.5172 | 1.531 | 55.744 | 26.777 | plastic |
| | image-side surface 82 | 5.0770 | 0.2000 | | | | |
| optical filter 9 | object-side surface 91 | ∞ | 0.2100 | | | | |
| | image-side surface 92 | ∞ | 0.2562 | | | | |
| image plane 100 | | ∞ | | | | | |

FIG.27

| surface | 31 | 32 | 41 | 42 | 51 | 52 |
|---|---|---|---|---|---|---|
| K | 0 | 0 | 0 | 0 | 0 | 0 |
| a4 | 0.104844 | 0.156782 | -0.010432 | -0.226399 | -0.154436 | 0.262947 |
| a6 | -0.780140 | 0.028794 | -0.423893 | -0.344386 | 0.354437 | -0.186942 |
| a8 | 0.700314 | 0.001372 | 0.356245 | 1.712888 | 0.367528 | -0.581541 |
| a10 | -0.014557 | | | | 2.341635 | 0.665855 |
| a12 | -0.053105 | | | | | 4.257583 |
| a14 | | | | | | |
| a16 | | | | | | |

| surface | 61 | 62 | 71 | 72 | 81 | 82 |
|---|---|---|---|---|---|---|
| K | 0 | 0 | 0 | 0 | 0 | 0 |
| a4 | 0.104844 | -0.198635 | -0.109467 | 0.002109 | -0.086499 | -0.107239 |
| a6 | -0.780140 | -0.106302 | 0.027009 | -0.042421 | 1.80945E-02 | -1.90812E-02 |
| a8 | 0.700314 | 0.155064 | -0.046686 | -0.000238 | -2.68025E-04 | 4.64538E-03 |
| a10 | -0.014557 | -0.113930 | | | 7.44734E-04 | 6.29353E-04 |
| a12 | -0.053105 | | | | 3.24305E-05 | 1.54278E-04 |
| a14 | | | | | -3.78161E-04 | 6.50996E-05 |
| a16 | | | | | -4.90009E-04 | 1.46183E-04 |

FIG.28

FIG.31 system focal length =2.008mm , half field-of-view =70.00°, F-number =2.2, system length =3.7307mm

| lens element | surface | radius of curvature | thickness | refractive index | Abbe number | focal length | material |
|---|---|---|---|---|---|---|---|
| object | | ∞ | ∞ | | | | |
| first lens element 3 | object-side surface 31 | 35.0000 | 0.1880 | 1.640 | 23.529 | -185.499 | plastic |
| | image-side surface 32 | 27.0178 | 0.1565 | | | | |
| second lens element 4 | object-side surface 41 | -6.5407 | 0.3584 | 1.535 | 55.712 | 40.063 | plastic |
| | image-side surface 42 | -5.1113 | 0.0984 | | | | |
| aperture stop 2 | | ∞ | 0.0044 | | | | |
| third lens element 5 | object-side surface 51 | 2.6012 | 0.5520 | 1.544 | 56.114 | 1.420 | plastic |
| | image-side surface 52 | -1.0211 | 0.1285 | | | | |
| fourth lens element 6 | object-side surface 61 | -12.6108 | 0.2606 | 1.640 | 23.529 | -2.392 | plastic |
| | image-side surface 62 | 1.7707 | 0.0879 | | | | |
| fifth lens element 7 | object-side surface 71 | 2.8428 | 0.3720 | 1.535 | 55.712 | 11.953 | plastic |
| | image-side surface 72 | 4.8709 | 0.0399 | | | | |
| sixth lens element 8 | object-side surface 81 | 5.4269 | 0.9546 | 1.531 | 55.744 | -7.881 | plastic |
| | image-side surface 82 | 2.2228 | 0.2000 | | | | |
| optical filter 9 | object-side surface 91 | ∞ | 0.2100 | | | | |
| | image-side surface 92 | ∞ | 0.1194 | | | | |
| image plane 100 | | ∞ | | | | | |

| surface | 31 | 32 | 41 | 42 | 51 | 52 |
|---|---|---|---|---|---|---|
| K | 0 | 0 | 0 | 0 | 0 | 0 |
| a4 | -0.043481 | 0.230388 | 0.145446 | -0.064238 | -0.150236 | 0.293123 |
| a6 | -1.347390 | 0.039374 | -0.802198 | -0.945321 | 0.277359 | -0.567691 |
| a8 | 1.626797 | -0.086163 | 0.456790 | 1.808196 | -1.175061 | -0.299911 |
| a10 | -0.138725 | | | | 2.247736 | 0.614109 |
| a12 | -0.242812 | | | | | 3.370609 |
| a14 | | | | | | |
| a16 | | | | | | |

| surface | 61 | 62 | 71 | 72 | 81 | 82 |
|---|---|---|---|---|---|---|
| K | 0 | 0 | 0 | 0 | 0 | 0 |
| a4 | | -0.225345 | -0.020874 | 0.014399 | -0.070756 | -0.112332 |
| a6 | | -0.174482 | 0.039373 | -0.073048 | 2.75188E-02 | -1.00861E-02 |
| a8 | | 0.315119 | -0.118547 | 0.016902 | 1.02700E-02 | 7.90892E-03 |
| a10 | | -0.233170 | | | 1.75116E-03 | 7.75184E-04 |
| a12 | | | | | -5.34184E-04 | 1.54808E-04 |
| a14 | | | | | -1.48690E-03 | -7.14170E-05 |
| a16 | | | | | -8.10698E-04 | -7.16474E-05 |

FIG.32

| relationship | first preferred embodiment | second preferred embodiment | third preferred embodiment | fourth preferred embodiment |
|---|---|---|---|---|
| ALT | 2.068 | 2.262 | 2.408 | 3.611 |
| Gaa | 0.742 | 0.522 | 0.673 | 0.559 |
| BFL | 0.821 | 0.820 | 0.730 | 0.696 |
| Gaa/T5 | 3.000 | 1.501 | 2.386 | 1.738 |
| T6/T3 | 0.962 | 0.931 | 1.408 | 1.015 |
| ALT/G12 | 7.387 | 9.879 | 9.486 | 20.929 |
| T6/G12 | 1.800 | 2.257 | 2.693 | 3.203 |
| (G23+G34)/G12 | 0.842 | 0.565 | 0.885 | 1.127 |
| T6/T1 | 2.291 | 2.349 | 3.141 | 0.368 |
| T3/T4 | 2.123 | 2.061 | 1.885 | 1.777 |
| (G34+G56)/G12 | 0.937 | 0.718 | 0.840 | 1.100 |
| ALT/T5 | 8.362 | 6.504 | 8.539 | 11.227 |
| (G23+G34)/T4 | 0.956 | 0.481 | 0.872 | 0.635 |
| T2/(G45+G56) | 1.444 | 2.158 | 2.478 | 2.000 |
| T5/T1 | 1.124 | 1.581 | 1.296 | 0.214 |
| Gaa/(G23+G34) | 3.147 | 4.035 | 2.996 | 2.876 |
| T5/(G45+G56) | 1.093 | 2.123 | 1.450 | 1.674 |
| T5/T3 | 0.472 | 0.627 | 0.581 | 0.591 |

FIG.34

| relationship | fifth preferred embodiment | sixth preferred embodiment | seventh preferred embodiment | eighth preferred embodiment |
|---|---|---|---|---|
| ALT | 1.969 | 1.811 | 4.666 | 2.686 |
| Gaa | 0.705 | 0.871 | 0.714 | 0.516 |
| BFL | 0.795 | 0.544 | 0.666 | 0.529 |
| Gaa/T5 | 1.996 | 4.152 | 1.233 | 1.386 |
| T6/T3 | 0.554 | 0.518 | 0.920 | 1.729 |
| ALT/G12 | 6.639 | 14.602 | 25.119 | 17.159 |
| T6/G12 | 1.000 | 2.079 | 2.784 | 6.099 |
| (G23+G34)/G12 | 0.647 | 2.398 | 1.632 | 1.478 |
| T6/T1 | 1.348 | 1.258 | 0.212 | 5.078 |
| T3/T4 | 2.225 | 2.373 | 2.203 | 2.119 |
| (G34+G56)/G12 | 0.769 | 4.599 | 1.254 | 1.076 |
| ALT/T5 | 5.572 | 8.637 | 8.055 | 7.219 |
| (G23+G34)/T4 | 0.797 | 1.419 | 1.188 | 0.888 |
| T2/(G45+G56) | 1.488 | 0.960 | 1.400 | 2.803 |
| T5/T1 | 1.606 | 1.023 | 0.238 | 1.979 |
| Gaa/(G23+G34) | 3.674 | 2.927 | 2.355 | 2.229 |
| T5/(G45+G56) | 1.629 | 0.467 | 2.572 | 2.910 |
| T5/T3 | 0.660 | 0.421 | 1.030 | 0.674 |

FIG.35

IMAGING LENS, AND ELECTRONIC APPARATUS INCLUDING THE SAME

CROSS-REFERENCE TO RELATED APPLICATION

This application claims priority to Chinese Application No. 201410234542.5, filed on May 29, 2014.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

U.S. Pat. No. 8,385,006 discloses a conventional imaging lens that includes first, second, third, fourth fifth and sixth lens elements. The first lens element has a positive refractive power and the third lens element has a negative refractive power. Such structure results in a relatively small field of view of the conventional imaging lens, and does not meet current demands of a larger field of view.

Therefore, it is required to develop a miniaturized optical imaging lens having an increased field of view, reduced dimensions, and good imaging quality that may satisfy requirements of consumer electronic products.

SUMMARY OF THE INVENTION

Therefore, an object of the present invention is to provide an imaging lens having a relatively large field of view while maintaining good optical performance.

According to one aspect of the present invention, an imaging lens comprises a first lens element, a second lens element, a third lens element, a fourth lens element, a fifth lens element and a sixth lens element arranged in order from an object side to an image side along an optical axis of the imaging lens. Each of the first lens element, the second lens element, the third lens element, the fourth lens element, the fifth lens element and the sixth lens element has a refractive power, an object-side surface facing toward the object side and an image-side surface facing toward the image side.

The first lens element has a negative refractive power. The object-side surface of the first lens element is a convex surface that has a convex portion in a vicinity of the optical axis and a convex portion in a vicinity of the periphery. The image-side surface of the second lens element has a convex portion in a vicinity of a periphery of the second lens element. The third lens element has a positive refractive power and the image-side surface of the third lens element has a convex portion in a vicinity of a periphery of the third lens element. The object-side surface of the fourth lens element has a concave portion in a vicinity of a periphery of the fourth lens element. The object-side surface of the fifth lens element has a concave portion in a vicinity of a periphery of the fifth lens element. The image-side surface of the sixth lens element has a concave portion in a vicinity of the optical axis and a convex portion in a vicinity of a periphery of the sixth lens element. The imaging lens does not include any lens element with refractive power other than the aforesaid lens elements 3-8.

Another object of the present invention is to provide an electronic apparatus having an imaging lens with six lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 31 shows values of some optical parameters corresponding to the imaging lens of the eighth preferred embodiment;

FIG. 32 shows values of some parameters of an optical relationship corresponding to the imaging lens of the eighth preferred embodiment;

FIGS. 34 and 35 are tables each listing values of parameters of other optical relationships corresponding to the imaging lenses of the first to eighth preferred embodiments;

DETAILED DESCRIPTION OF THE PREFERRED EMBODIMENTS

Figure 1:
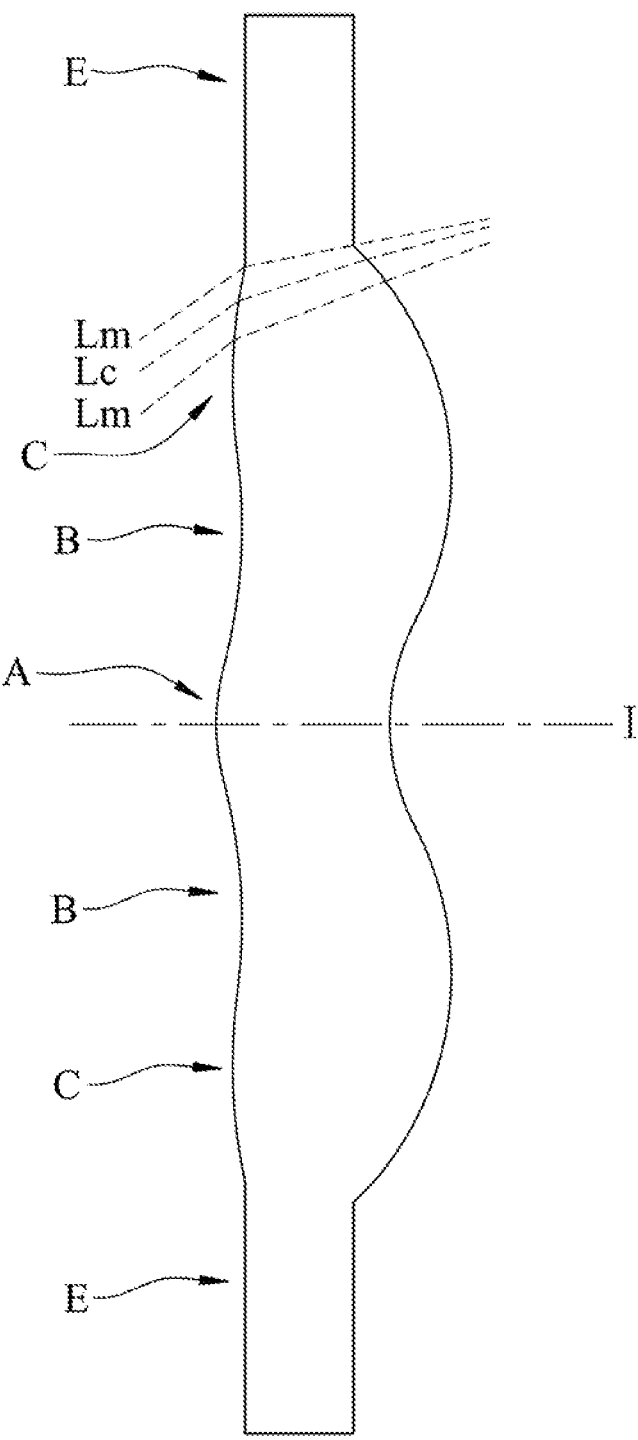
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
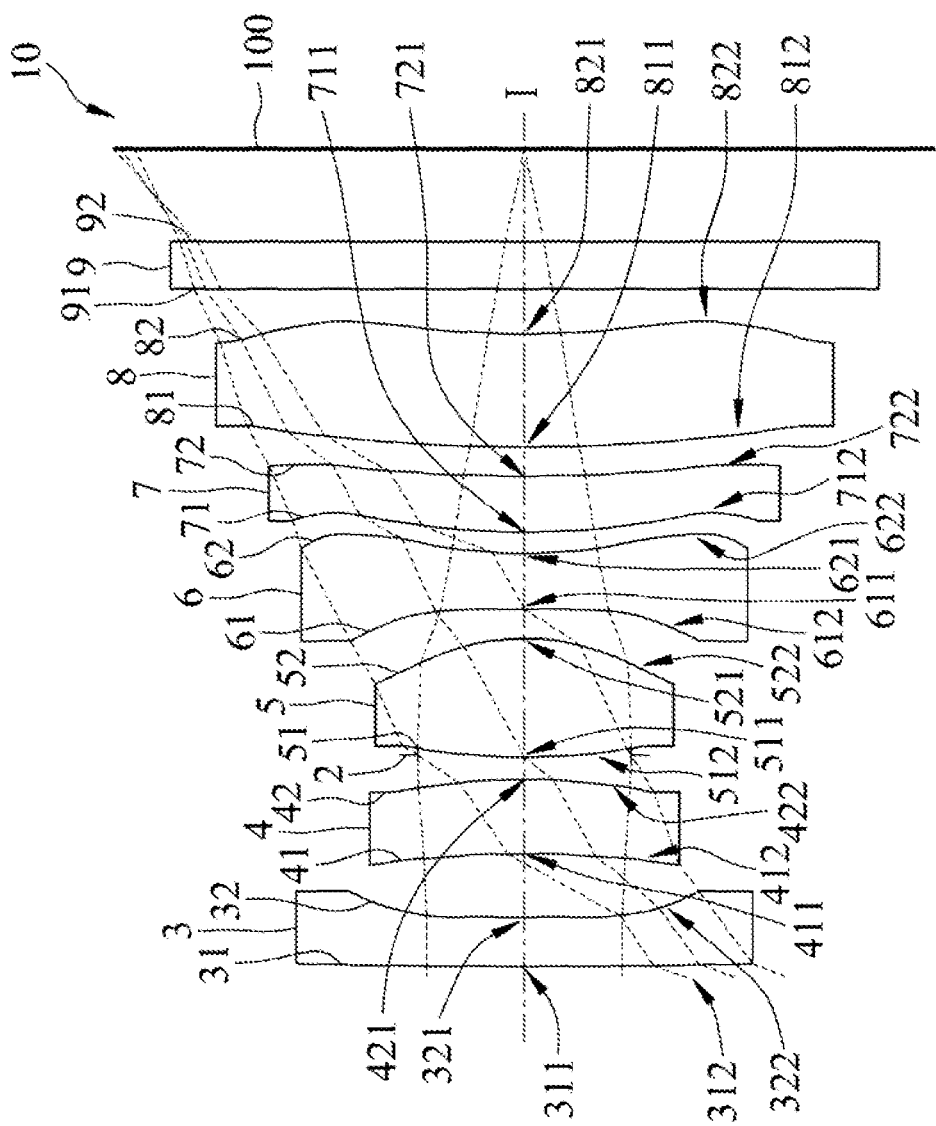
FIG. 2 is a schematic diagram that illustrates the first preferred embodiment of an imaging lens according to the present invention.

Referring to FIG. 2, the first preferred embodiment of an imaging lens 10 according to the present invention includes a first lens element 3, a second lens element 4, an aperture stop 2, a third lens element 5, a fourth lens element 6, a fifth lens elements 7, a sixth lens element 8 and an optical filter 9 arranged in the given order along an optical axis (I) from an object side to an image side. The optical filter 9 is an infrared cut filter for selectively absorbing infrared light to thereby reduce imperfection of images formed at an image plane 100.

Each of the first, second, third, fourth, fifth and sixth lens elements 3-8 and the optical filter 9 has an object-side surface 31, 41, 51, 61, 71, 81, 91 facing toward the object side, and an image-side surface 32, 42, 52, 62, 72, 82, 92 facing toward the image side. Light entering the imaging lens 10 travels through the object-side and image-side surfaces 31, 32 of the first lens element 3, the object-side and image-side surfaces 41, 42 of the second lens element 4, the aperture stop 2, the object-side and image-side surfaces 51, 52 of the third lens element 5, the object-side and image-side surfaces 61, 62 of the fourth lens element 6, the object-side and image-side surfaces 71, 72 of the fifth lens element 7, the object-side and image-side surfaces 81, 82 of the sixth lens element 8, and the object-side and image-side surfaces 91, 92 of the optical filter 9, in the given order, to form an image on the image plane 100. Each of the object-side surfaces 41, 51, 61, 71, 81 and the image-side surfaces 32, 42, 52, 62, 72, 82 is aspherical and has a center point coinciding with the optical axis (I).

The lens elements 3-8 are made of a plastic material in this embodiment such that weight and cost of the imaging lens 10 may be reduced. It should be noted that the lens elements 3-8 may be made of other materials in other embodiments.

In the first preferred embodiment, which is depicted in FIG. 2, the first lens element 3 has a negative refractive power. The object-side surface 31 of the first lens element 3 is a convex surface that has a convex portion 311 in a vicinity of the optical axis (I) and a convex portion 312 in a vicinity of a periphery of the first lens element 3. The image-side surface 32 of the first lens element 3 is a concave surface that has a concave portion 321 in a vicinity of the optical axis (I) and a concave portion 322 in a vicinity of the periphery of the first lens element 3.

The second lens element 4 has a positive refractive power. The object-side surface 41 of the second lens element 4 is a concave surface that has a concave portion 411 in a vicinity of the optical axis (I), and a concave portion 412 in a vicinity of a periphery of the second lens element 4. The image-side surface 42 of the second lens element 4 is a convex surface that has a convex portion 421 in a vicinity of the optical axis (I), and a convex portion 422 in a vicinity of the periphery of the second lens element 4.

The third lens element 5 has a positive refractive power. The object-side surface 51 of the third lens element 5 is a convex surface that has a convex portion 511 in a vicinity of the optical axis (I), and a convex portion 512 in a vicinity of a periphery of the third lens element 5. The image-side surface 52 of the third lens element 5 is a convex surface that has a convex portion 521 in a vicinity of the optical axis (I), and a convex portion 522 in a vicinity of the periphery of the third lens element 5.

The fourth lens element 6 has a negative refractive power. The object-side surface 61 of the fourth lens element 6 is a concave surface that has a concave portion 611 in a vicinity of the optical axis (I), and a concave portion 612 in a vicinity of a periphery of the fourth lens element 6. The image-side surface 62 of the fourth lens element 6 has a concave portion 621 in a vicinity of the optical axis (I), and a convex portion 622 in a vicinity of the periphery of the fourth lens element 6.

The fifth lens element 7 has a positive refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

The sixth lens element 8 has a negative refractive power. The object-side surface 81 of the sixth lens element 8 is a convex surface that has a convex portion 311 in a vicinity of the optical axis (I) and a convex portion 812 in a vicinity of a periphery of the sixth lens element 8. The image-side surface 82 of the sixth lens element 8 has a concave portion 821 in a vicinity of the optical axis (I) and a convex portion 822 in a vicinity of a periphery of the sixth lens element 8.

In the first preferred embodiment, the imaging lens 10 does not include any lens element with refractive power other than the aforesaid lens elements 3-8.

Shown in FIG. 3 is a table that lists values of some optical parameters corresponding to the surfaces 31-91, 32-92 of the first preferred embodiment. The imaging lens 10 has an overall system effective focal length (EFL) of 2.037 mm, a half field-of-view (HFOV) of 70.00°, an F-number of 2.2, and a system length of 3.6309 mm. The system length refers to a distance between the object-side surface 31 of the first lens element 3 and the image plane 100 at the optical axis (I).

In this embodiment, each of the object-side surfaces 41-81 and the image-side surfaces 32-82 is aspherical, and satisfies the optical relationship of $$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

where:
Y represents a perpendicular distance between an arbitrary point on an aspherical surface and the optical axis (I);
Z represents a depth of the aspherical surface, which is defined as a perpendicular distance between the arbitrary point on the aspherical surface that is spaced apart from the optical axis (I) by a distance Y, and a tangent plane at a vertex of the aspherical surface at the optical axis (I);
R represents a radius of curvature of the aspherical surface;
K represents a conic constant; and
$a_{2i}$ represents a $2i^{th}$ aspherical coefficient.

Shown in FIG. 4 is a table that lists values of some optical parameters of the aforementioned optical relationship (1) corresponding to the first preferred embodiment. Note that in FIG. 4, the column under "32" represents aspherical coefficients of the image-side surface 32 of the first lens element 3 and the values listed in the other columns correspond to other surfaces of the lens elements 4-8.

Relationships among some of the aforementioned optical parameters corresponding to the first preferred embodiment are shown in FIG. 34, where:
T1 represents a thickness of the first lens element 3 at the optical axis (I);
T2 represents a thickness of the second lens element 4 at the optical axis (I);
T3 represents a thickness of the third lens element 5 at the optical axis (I);
T4 represents a thickness of the fourth lens element 6 at the optical axis (I);
T5 represents a thickness of the fifth lens element 7 at the optical axis (I);
T6 represents a thickness of the sixth lens element 8 at the optical axis (I);
G12 represents an air gap width between the first lens element 3 and the second lens element 4 at the optical axis (I);
G23 represents an air gap width between the second lens element 4 and the third lens element 5 at the optical axis (I);
G34 represents an air gap width between the third lens element 5 and the fourth lens element 6 at the optical axis (I);
G45 represents an air gap width between the fourth lens element 6 and the fifth lens element 7 at the optical axis (I);
G56 represents an air gap width between the fifth lens element 7 and the sixth lens element 8 at the optical axis (I);
Gaa represents a sum of air gap widths among the first lens element 3, the second lens element 4, the third lens element 5, the fourth lens element 6, the fifth lens element 7, and the sixth lens element 8 at the optical axis (I), i.e., a sum of G12, G23, G34, G45 and G56;
ALT represents a sum of the thicknesses of the first lens element 3, the second lens element 4, the third lens element 5, the fourth lens element 6, the fifth lens element 7 and the sixth lens element 8 at the optical axis (I), i.e., a sum of T1, T2, T3, T4, T5 and T6;
TTL represents a distance at the optical axis (I) between the object-side surface 31 of the first lens element 3 and the image plane 100 at the image side; and
BFL represents a distance at the optical axis (I) between the image-side surface 82 of the sixth lens element 8 and the image plane 100.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figure 5:
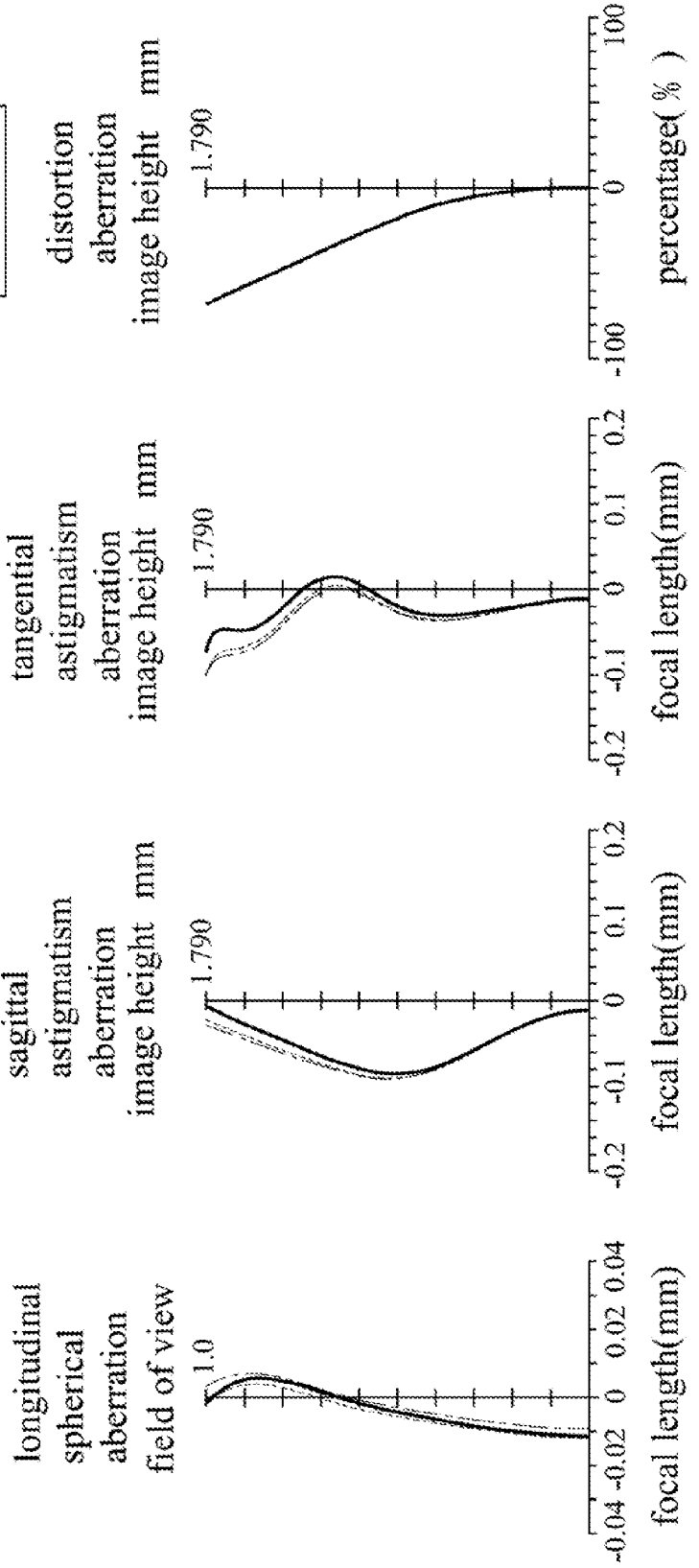
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.01 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.1 mm of focal length, the first preferred embodiment has a relatively low optical aberration.

Moreover, as shown in FIG. 5(d), since each of the curves corresponding to distortion aberration falls within the range of ±70%, the first preferred embodiment is able to meet requirements in imaging quality of most optical systems.

In view of the above, even with the system length reduced down to 3.6 mm, the imaging lens 10 of the first preferred embodiment is still able to achieve a relatively good optical performance.

It should be noted that the reference numerals of the concave portions and the convex portions in the following embodiments that are the same as those in the first embodiment are omitted in the drawings for the sake of brevity.

Figure 6:
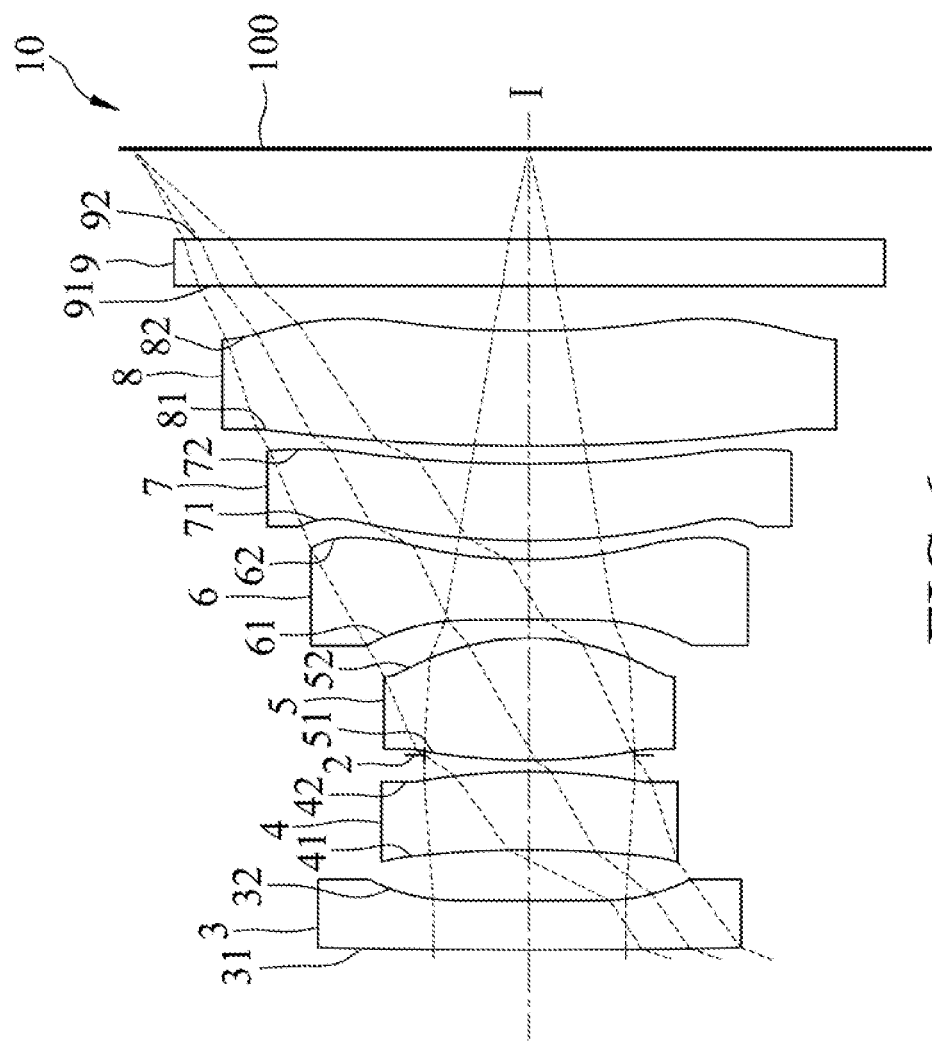
FIG. 6 is a schematic diagram that illustrates the second preferred embodiment of an imaging lens according to the present invention.
Figure 9:
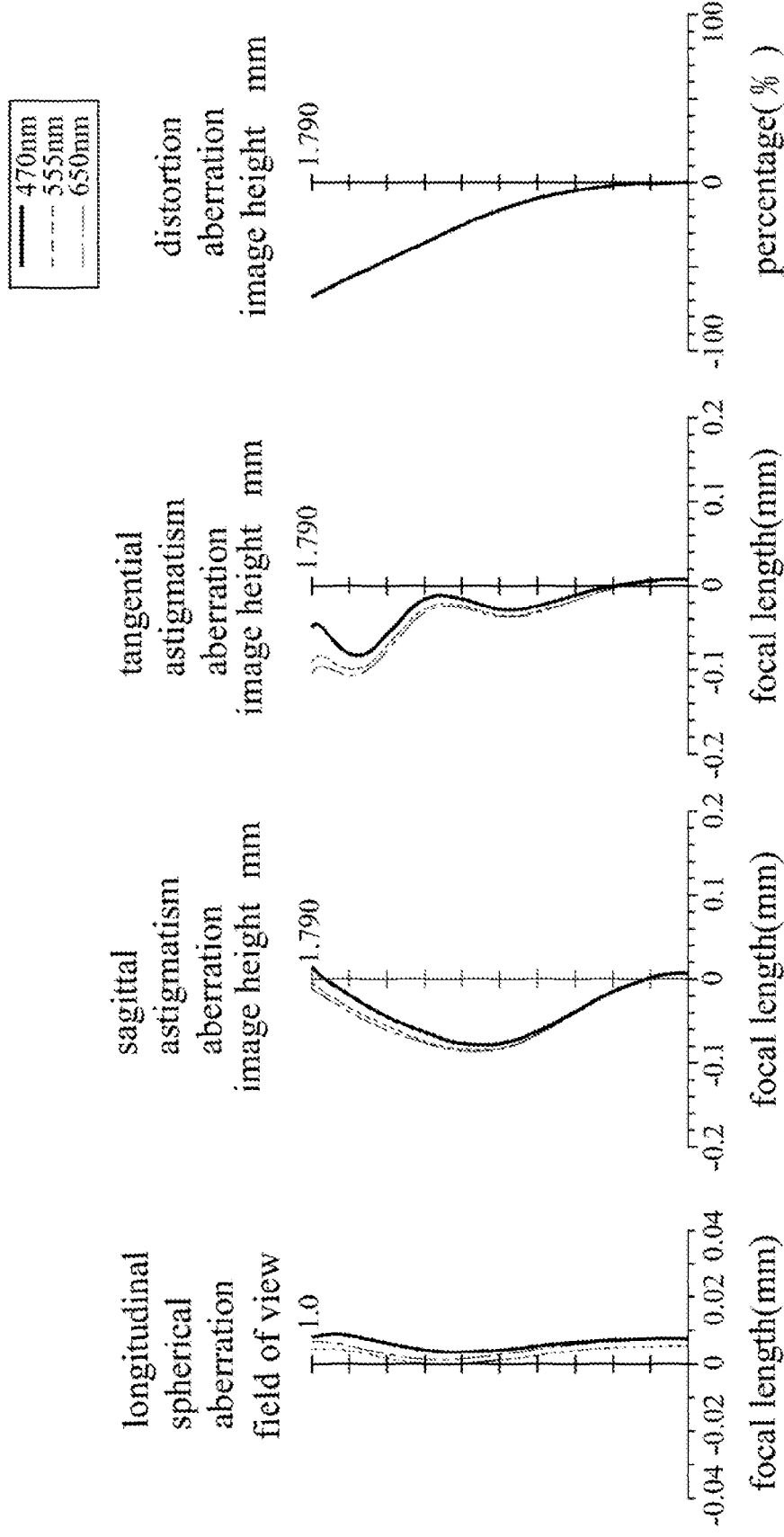
FIGS. 9(a) to 9(d) show different optical characteristics of the imaging lens of the second preferred embodiment.

Referring to FIG. 6, the differences between the first and second preferred embodiments of the imaging lens 10 of this invention reside in modifications of some optical data, aspherical coefficients and the lens parameters of the lens elements 3-8.

Shown in FIG. 7 is a table that lists values of some optical parameters corresponding to the surfaces 31-91, 32-92 of the second preferred embodiment. The imaging lens 10 has an overall system focal length of 2.031 mm, an HFOV of 70.00°, an F-number of 2.2, and a system length of 3.6041 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are shown in FIG. 34.

FIGS. 9(a) to 9(d) respectively show simulation results corresponding to longitudinal spherical aberration, sagittal astigmatism aberration, tangential astigmatism aberration, and distortion aberration of the second preferred embodiment. It can be understood from FIGS. 9(a) to 9(d) that the second preferred embodiment is able to achieve a relatively good optical performance.

Figure 10:
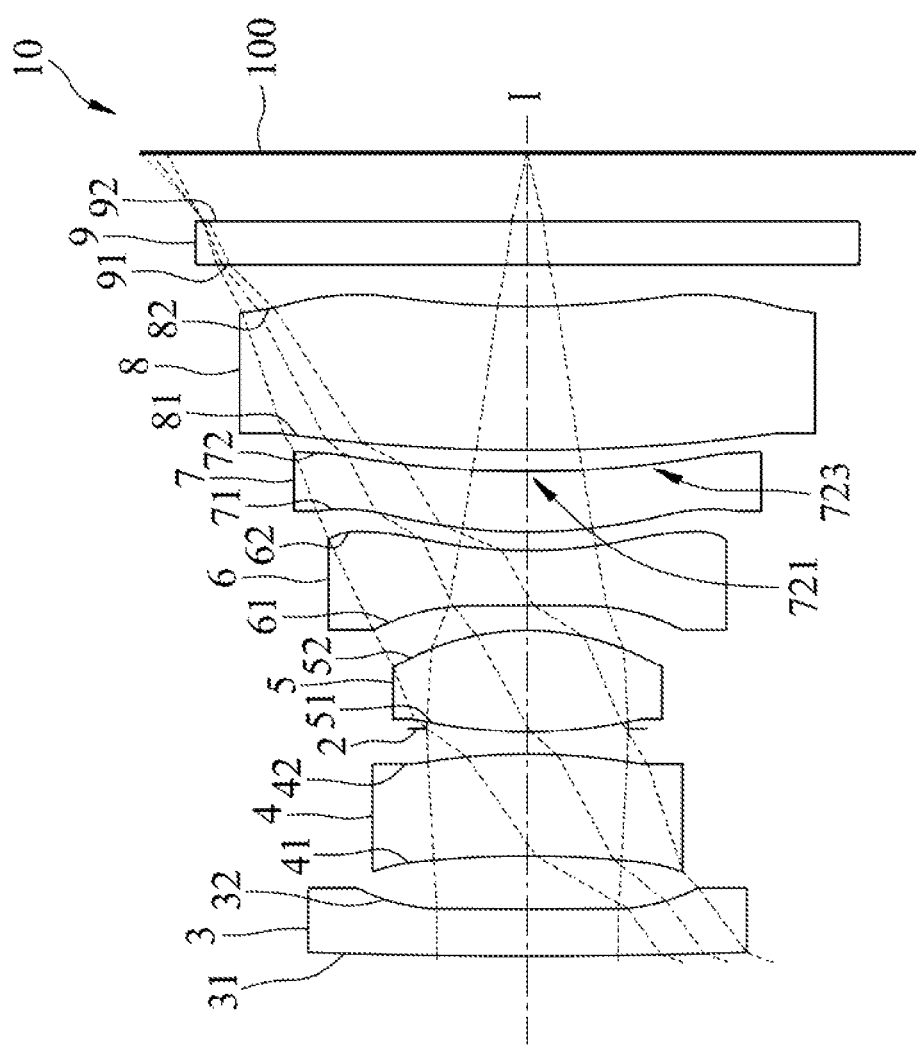
FIG. 10 is a schematic diagram that illustrates the third preferred embodiment of an imaging lens according to the present invention.
Figures 13A, 13B, 13C, 13D:
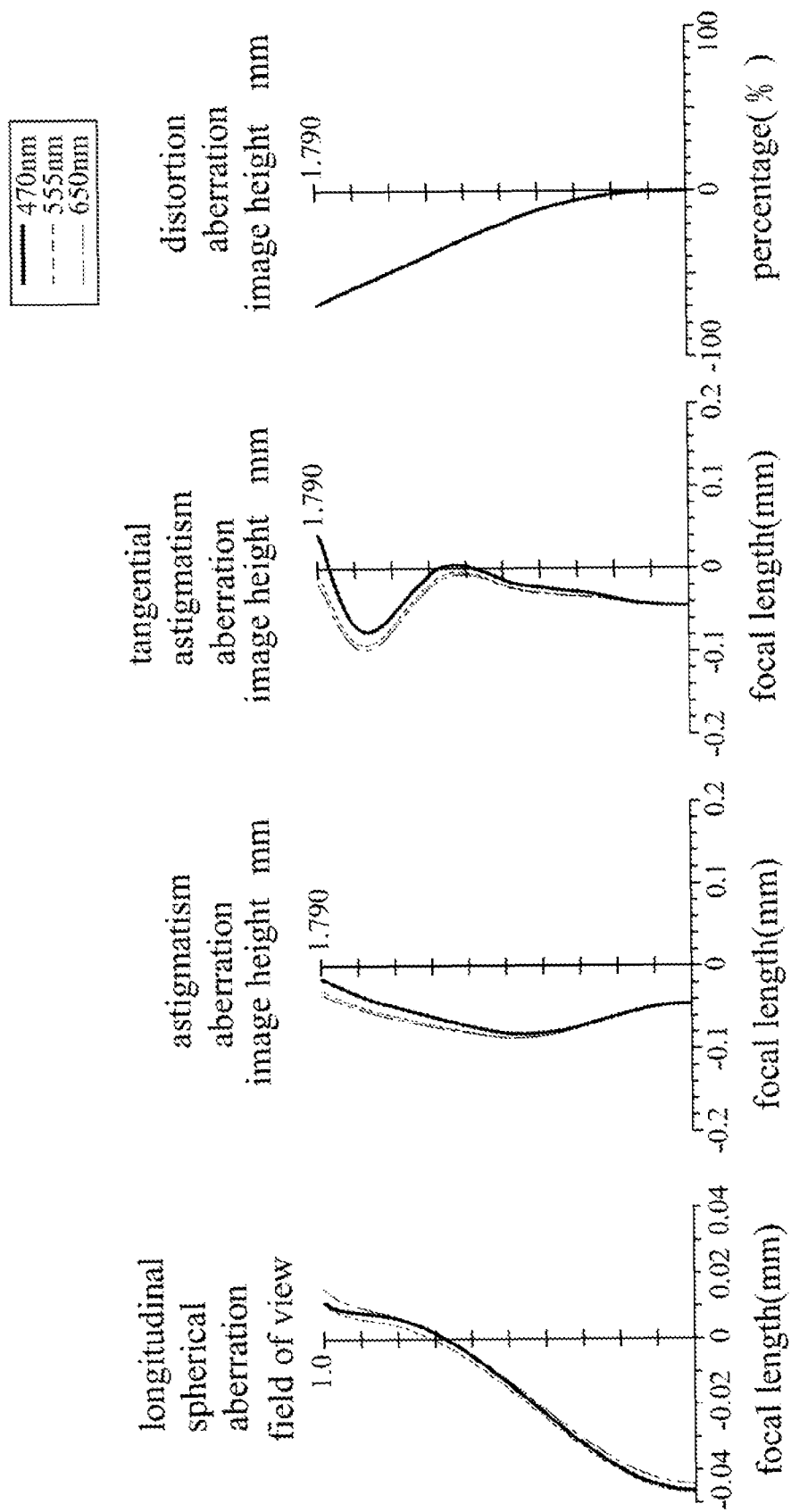
FIGS. 13(a) to 13(d) show different optical characteristics of the imaging lens of the third preferred embodiment.

Referring to FIG. 10, the first and third preferred embodiments are similar except for some optical data, aspherical coefficients and the lens parameters of the lens elements 3-3. In this embodiment, the image-side surface 72 of the fifth lens element 7 is a concave surface that has a concave portion 723 in a vicinity of the periphery of the fifth lens element 7.

Shown in FIG. 11 is a table that lists values of some optical parameters corresponding to the surfaces 31-91, 32-92 of the third preferred embodiment. The imaging lens 10 has an overall system focal length of 2.036 mm, an HFOV of 70.00°, an F-number of 2.2, and a system length of 3.8118 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are shown in FIG. 34.

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a) to 13(d) that the third preferred embodiment is able to achieve a relatively good optical performance.

Figure 14:
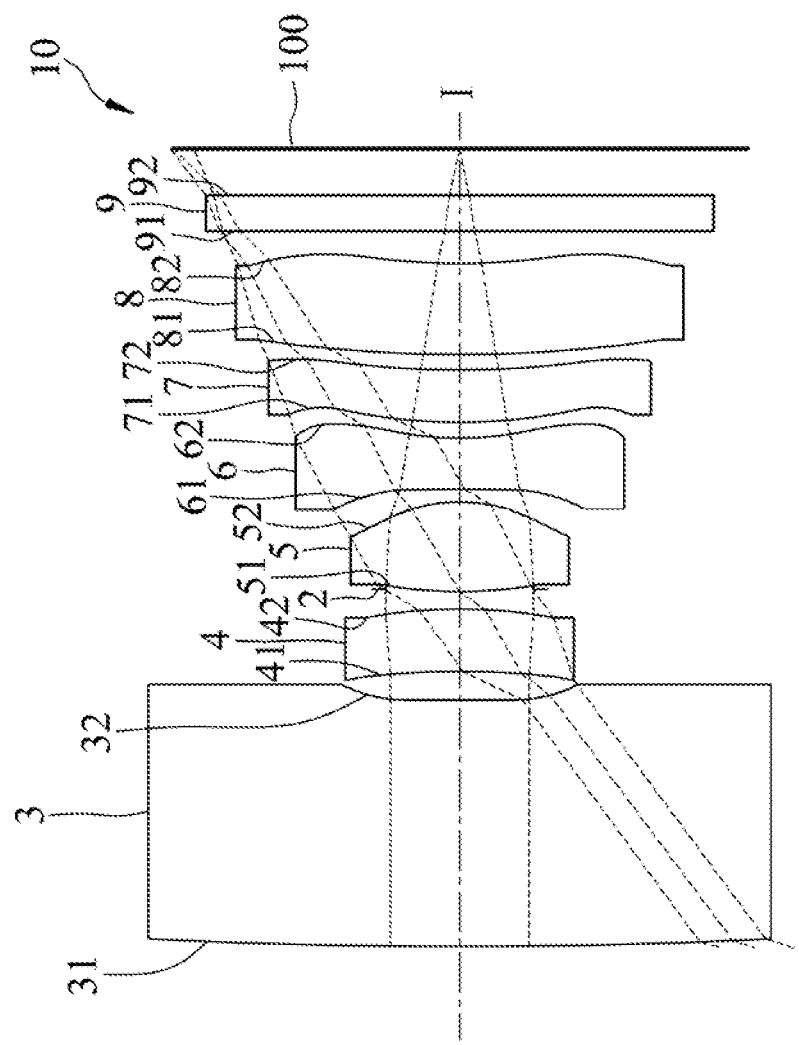
FIG. 14 is a schematic diagram that illustrates the fourth preferred embodiment of an imaging lens according to the present invention.
Figure 17:
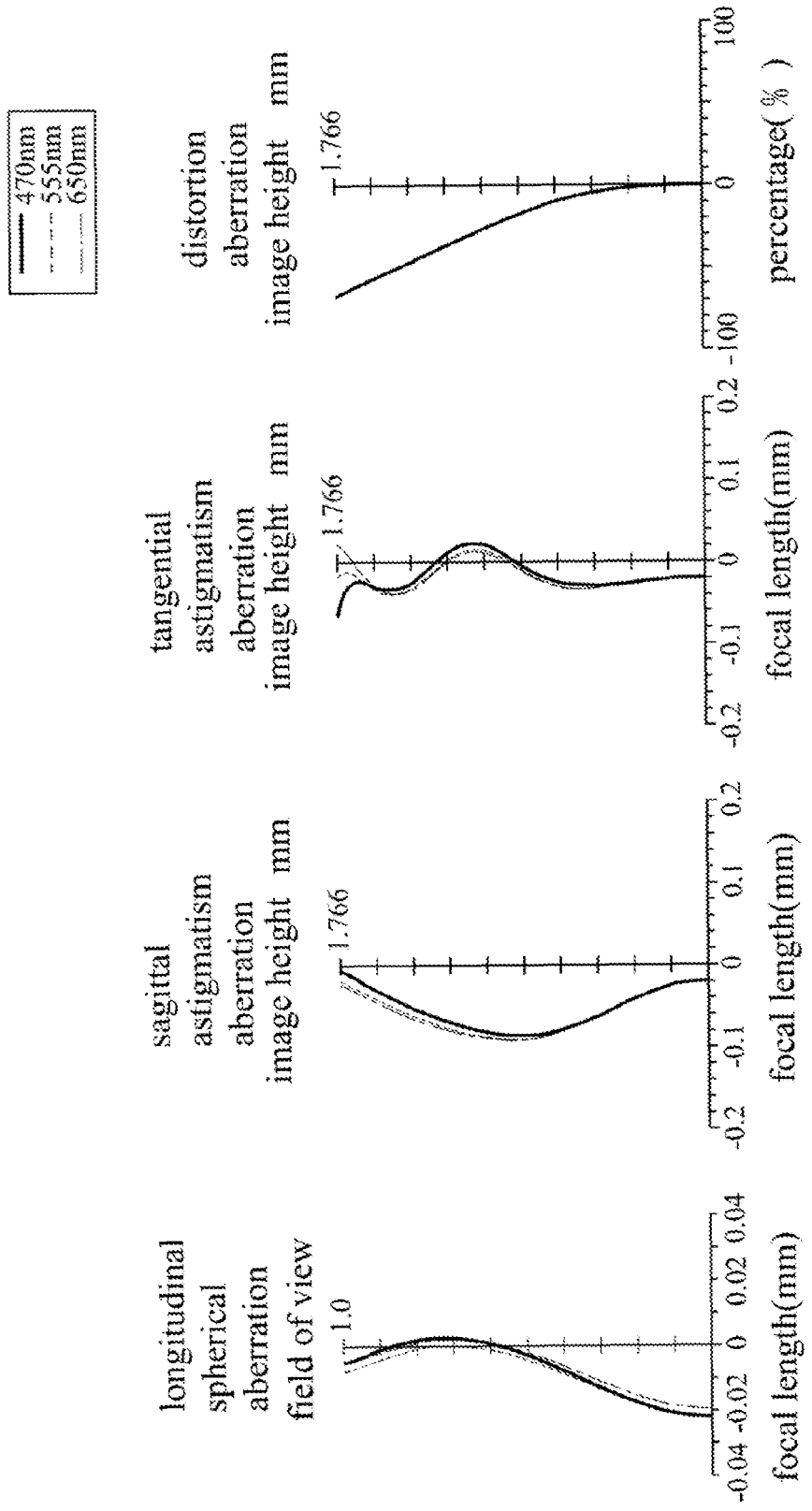
FIGS. 17(a) to 17(d) show different optical characteristics of the imaging lens of the fourth preferred embodiment.

Referring to FIG. 14, the fourth preferred embodiment is similar to the first preferred embodiment except for some optical data, aspherical coefficients and the lens parameters of the lens elements 3-8.

Shown in FIG. 15 is a table that lists values of some optical parameters corresponding to the surfaces 31-91, 32-92 of the fourth preferred embodiment. The imaging lens 10 has an overall system focal length of 1.983 mm, an HFOV of 70.00°, an F-number of 2.2, and a system length of 4.8654 mm.

Shown in FIG. 1.6 is a table that lists values of some optical parameters of the aforementioned optical relationship (1) corresponding to the fourth preferred embodiment.

Relationships among some of the aforementioned optical parameters corresponding to the fourth preferred embodiment are shown in FIG. 34.

FIGS. 17(a) to 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

Figure 18:
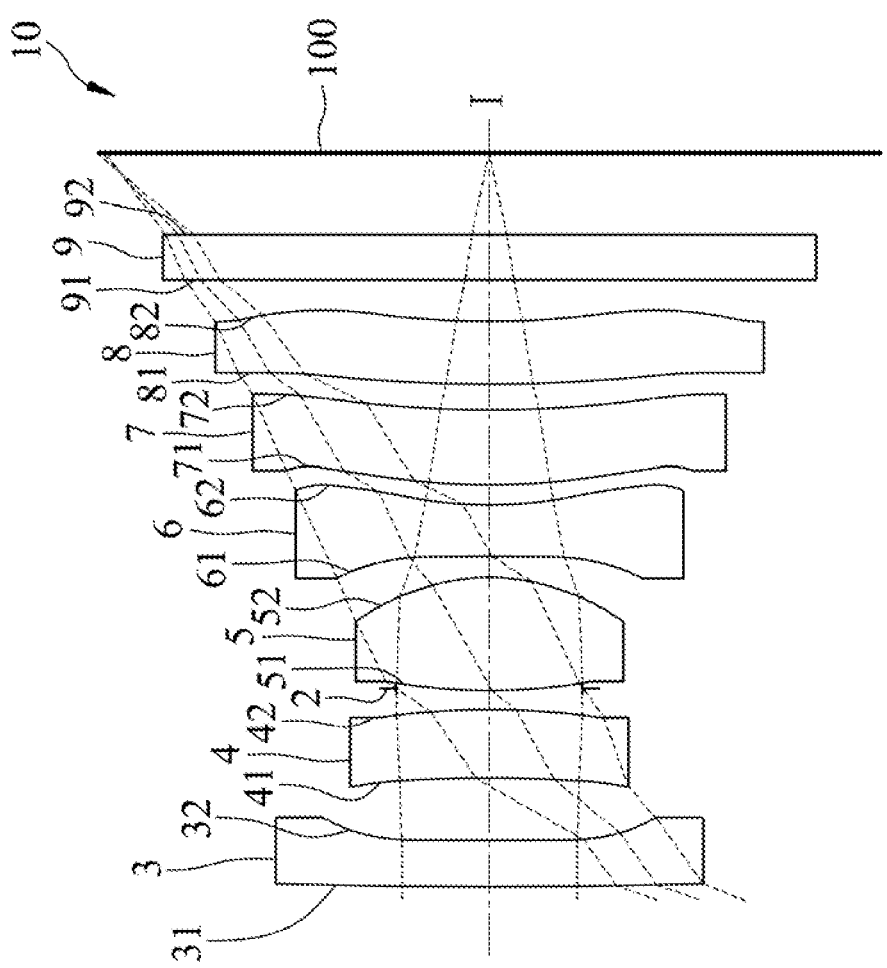
FIG. 18 is a schematic diagram that illustrates the fifth preferred embodiment of an imaging lens according to the present invention.
Figure 21:
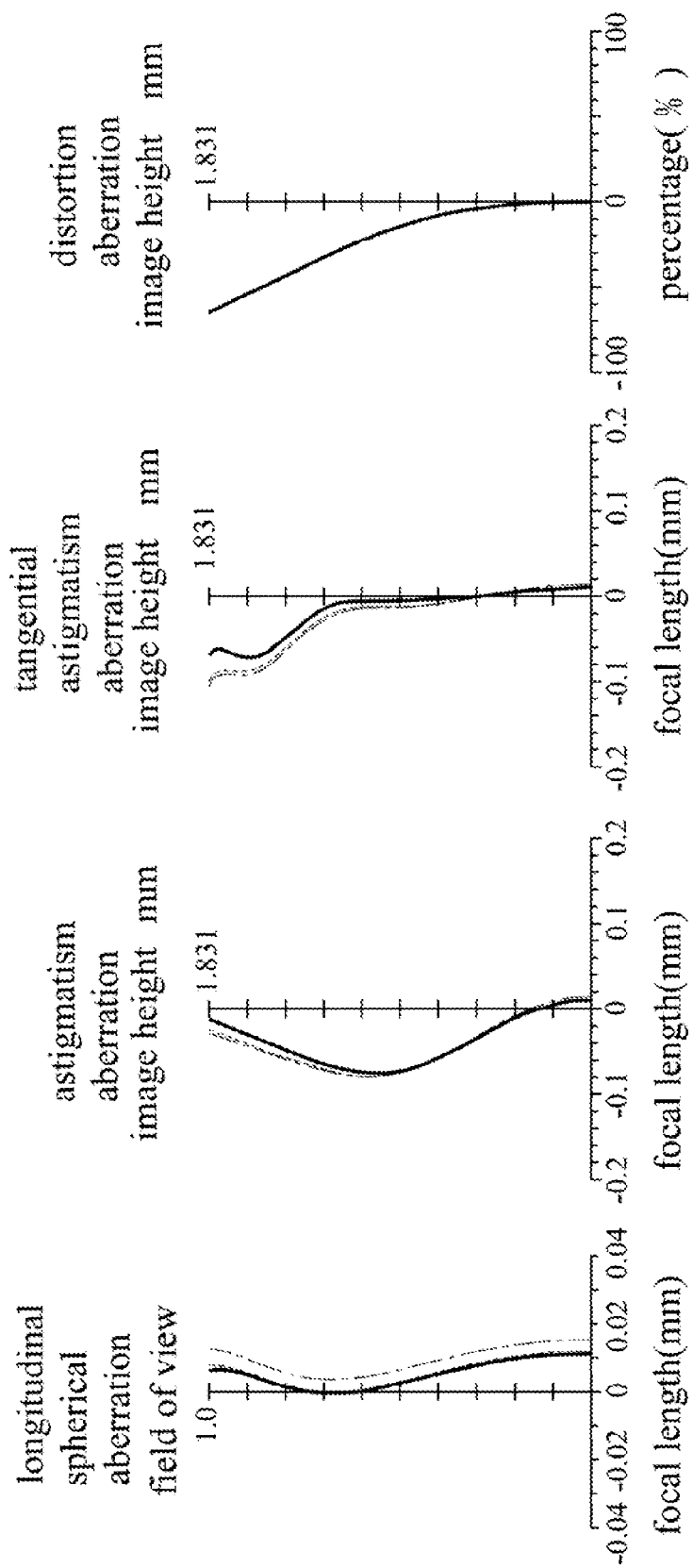
FIGS. 21(a) to 21(d) show different optical characteristics of the imaging lens of the fifth preferred embodiment.

Referring to FIG. 18, the first and fifth preferred embodiments are similar except for some optical data, aspherical coefficients and the lens parameters of the lens elements 3-8.

Shown in FIG. 19 is a table that lists values of some optical parameters corresponding to the surfaces 31-91, 32-92 of the fifth preferred embodiment. The imaging lens 10 has an overall system focal length of 1.917 mm, an HFOV of 70.00°, an F-number of 2.2, and a system length of 3.4691 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are shown in FIG. 35.

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a) to 21(d) that the fifth preferred embodiment is able to achieve a relatively good optical performance.

Figure 22:
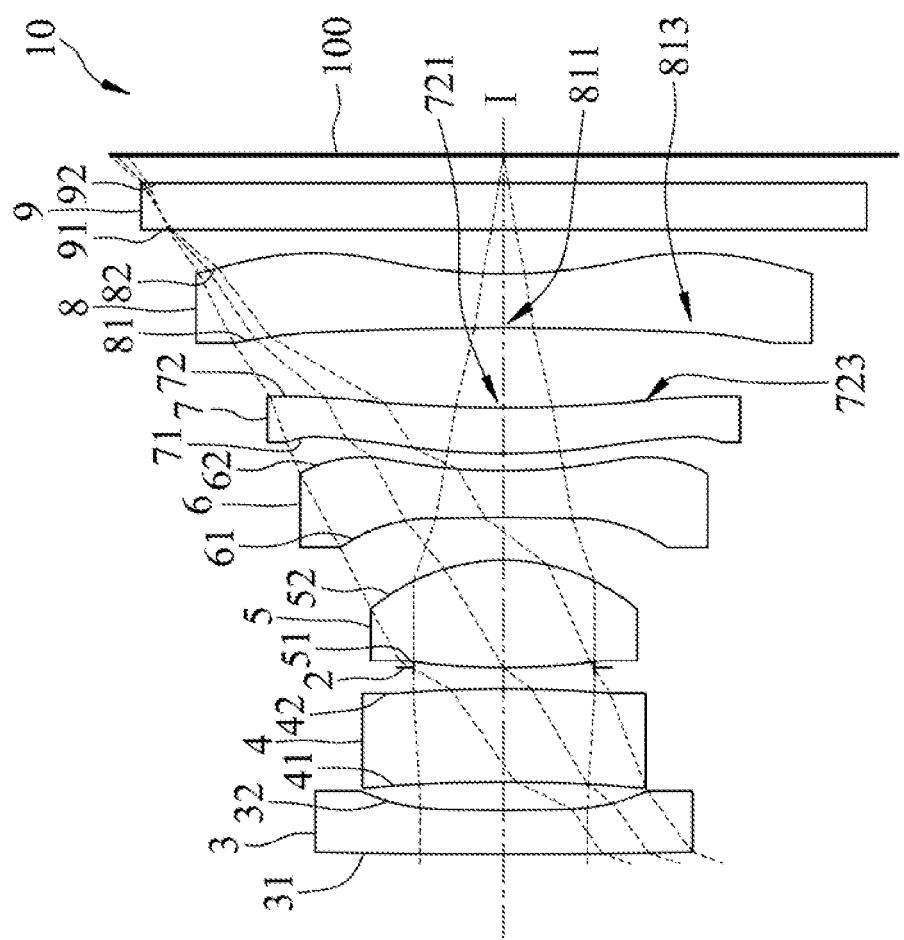
FIG. 22 is a schematic diagram that illustrates the sixth preferred embodiment of an imaging lens according to the present invention.
Figure 25:
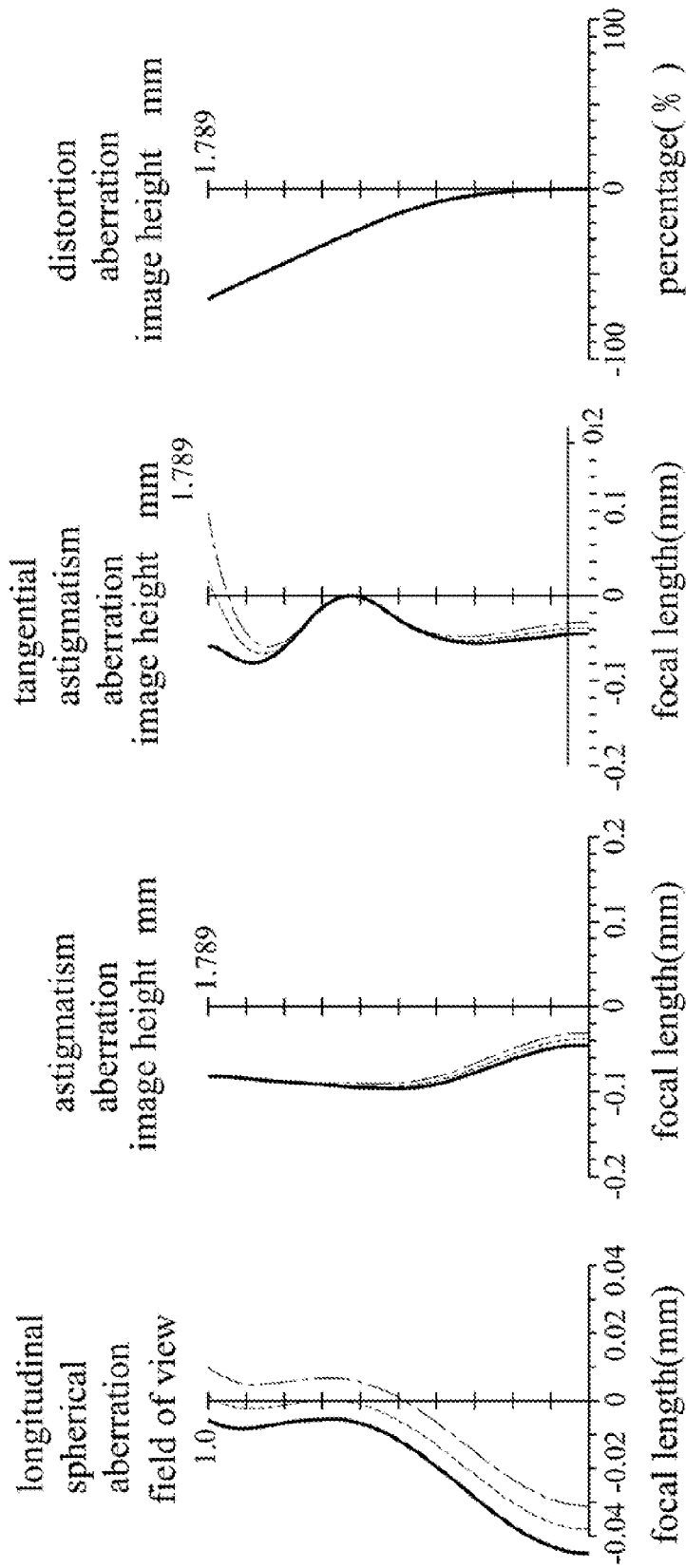
FIGS. 25(a) to 25(d) show different optical characteristics of the imaging lens of the sixth preferred embodiment.

FIG. 22 illustrates the sixth preferred embodiment of an imaging lens 10 according to the present invention, which has a configuration similar to that of the first preferred embodiment except for some optical data, aspherical coefficients and the lens parameters of the lens elements 3-8. The differences between the first and sixth preferred embodiments reside in that, in this embodiment, the image-side surface 72 of the fifth lens element 7 is a concave surface that has a concave portion 723 in a vicinity of the periphery of the fifth lens element 7. The object-side surface 81 of the sixth lens element 8 has a concave portion 813 in a vicinity of the periphery of the sixth lens element 8.

Shown in FIG. 23 is a table that lists values of some optical parameters corresponding to the surfaces 31-91, 32-92 of the sixth preferred embodiment. The imaging lens 10 has an overall system focal length of 1.814 mm, an HFOV of 70.00°, an F-number of 2.2, and a system length of 3.2264 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are shown in FIG. 35.

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25(a) to 25(d) that the sixth preferred embodiment is able to achieve a relatively good optical performance.

Figure 26:
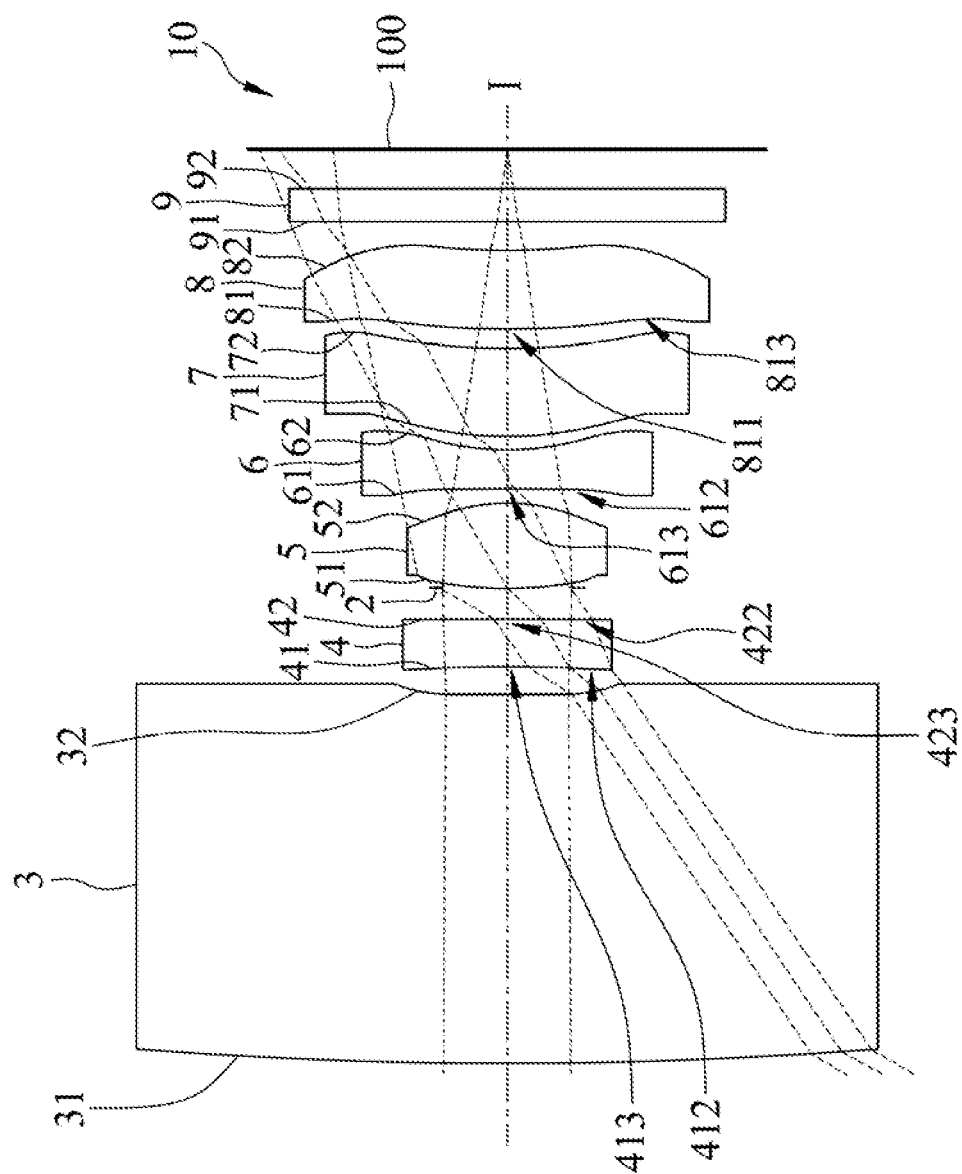
FIG. 26 is a schematic diagram that illustrates the seventh preferred embodiment of an imaging lens according to the present invention.
Figure 29:
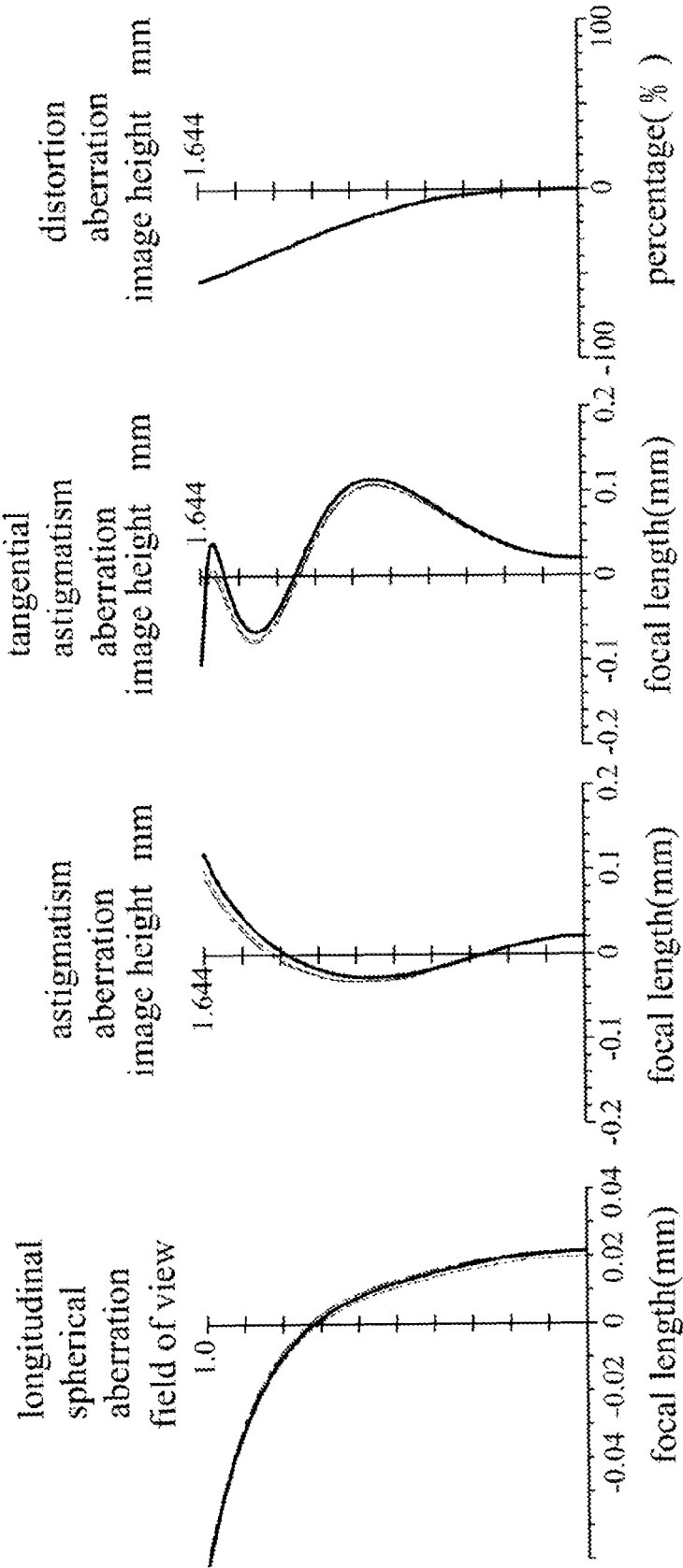
FIGS. 29(a) to 29(d) show different optical characteristics of the imaging lens of the seventh preferred embodiment.

Referring to FIG. 26, a seventh preferred embodiment of the imaging lens 10 according to the present invention is similar to the first preferred embodiment except for some optical data, aspherical coefficients and the lens parameters of the lens elements 3-8. The differences between the first and seventh preferred embodiments of the imaging lens 10 of this invention reside in that: the second lens element 4 has a negative refractive power and the object-side surface 41 of the second lens element 4 has a convex portion 413 in a vicinity of the optical axis (I). The image-side surface 42 of the second lens element 4 has a concave portion 423 in a vicinity of the optical axis (I). The object-side surface 61 of the fourth lens element 6 has a convex portion 613 in a vicinity of the optical axis (I). The sixth lens element 8 has a positive refractive power. The object-side surface 81 of the sixth lens element 8 has a concave portion 813 in a vicinity of the periphery of the sixth lens element 8.

Shown in FIG. 27 is a table that lists values of some optical parameters corresponding to the surfaces 31-91, 32-92 of the seventh preferred embodiment. The imaging lens 10 has an overall system focal length of 2.112 mm, an HFOV of 60.00°, an F-number of 2.4, and a system length of 6.0468 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are shown in FIG. 35.

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

Figure 30:
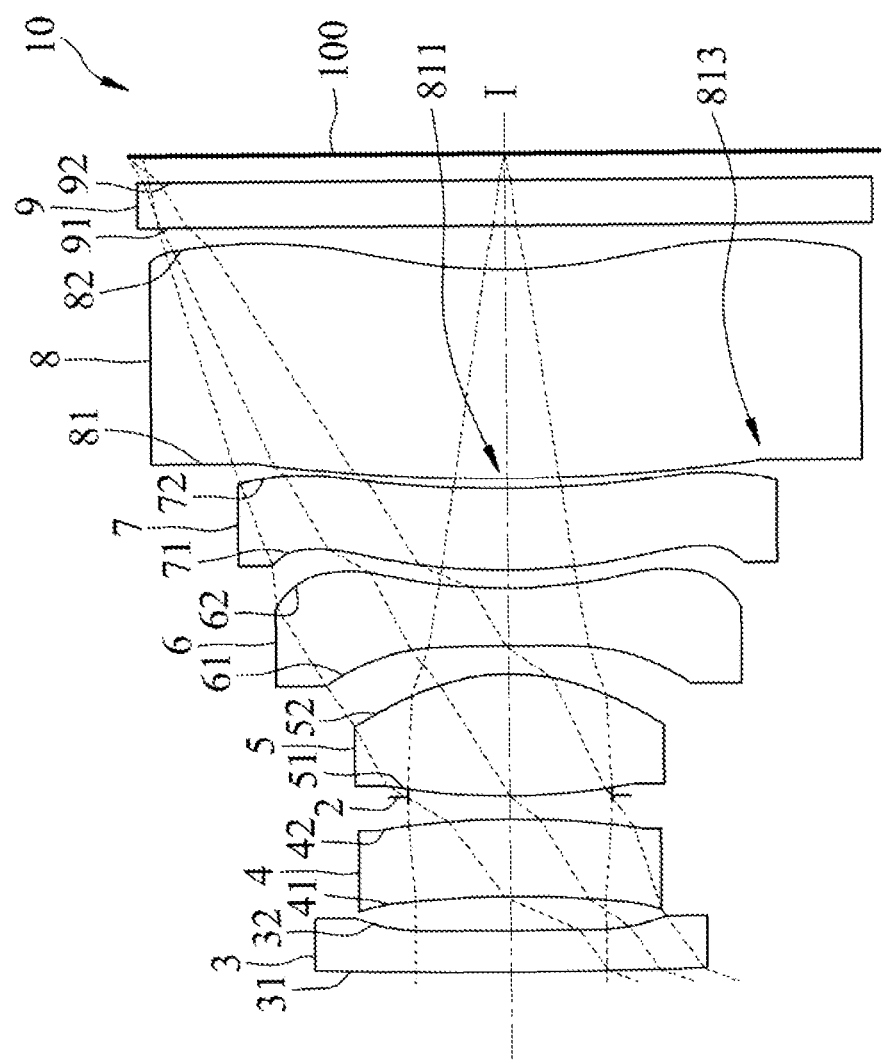
FIG. 30 is a schematic diagram that illustrates the eighth preferred embodiment of an imaging lens according to the present invention.
Figure 33:
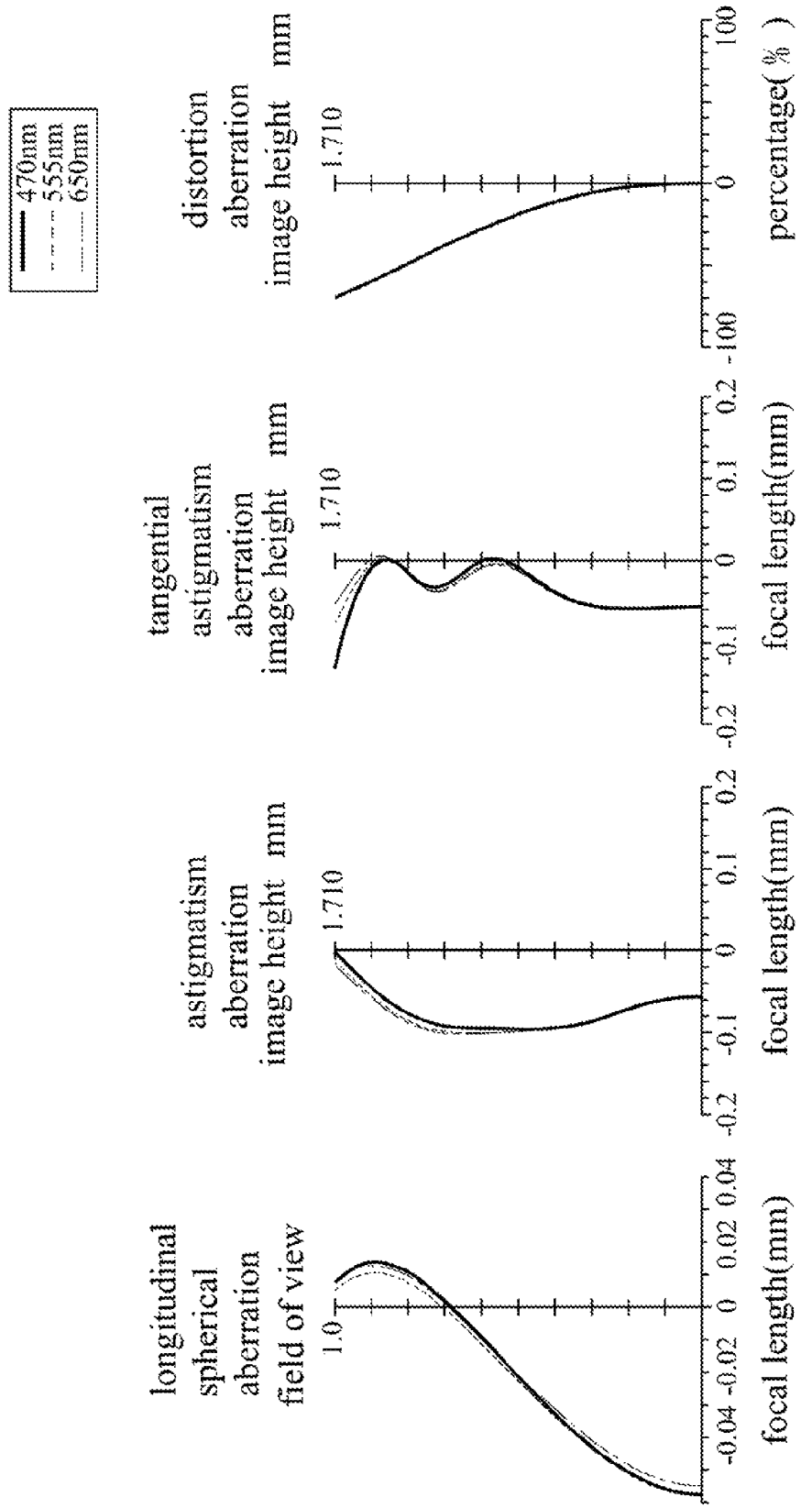
FIGS. 33(a) to 33(d) show different optical characteristics of the imaging lens of the eighth preferred embodiment.

Referring to FIG. 30, the differences between the first and eighth preferred embodiments of the imaging lens 10 of this invention reside in modifications of some optical data, aspherical coefficients and the lens parameters of the lens elements 3-8. Moreover, the object-side surface 81 of the sixth lens element 8 has a concave portion 813 in a vicinity of the periphery of the sixth lens element 8.

Shown in FIG. 31 is a table that lists values of some optical parameters corresponding to the surfaces 31-91, 32-92 of the eighth preferred embodiment. The imaging lens 10 has an overall system focal length of 2.008 mm, an HFOV of 70.00°, an F-number of 2.2, and a system length of 3.7307 mm.

Shown in FIG. 32 is a table that lists values of some optical parameters of the aforementioned optical relationship (1) corresponding to the eighth preferred embodiment.

Relationships among some of the aforementioned optical parameters corresponding to the eighth preferred embodiment are shown in FIG. 35.

FIGS. 33(a) to 33(d) respectively show simulation results corresponding to longitudinal spherical aberration, sagittal astigmatism aberration, tangential astigmatism aberration, and distortion aberration of the eighth preferred embodiment. It can be understood from FIGS. 33(a) to 33(d) that the eighth preferred embodiment is able to achieve a relatively good optical performance.

Shown in FIGS. 34 and 35 are tables that list relationships among some of the aforementioned optical parameters corresponding to the eight preferred embodiments for comparison. When each of the optical parameters of the imaging lens 10 according to this invention satisfies the following optical relationships, the system length may be reduced while maintaining good optical performance:

1. Gaa/T5≥1.25; T6/T3≤1.5; T6/G12≤7.0; T6/T1≤2.6; ALT/T5≥5.0; T5/T1≤2.1; T5/(G45+G56)≤2.7; and T5/T3≤1.05. Since reducing T5 and T6 may reduce optical aberration of the imaging lens 10, the designs of Gaa/T5 and ALT/T5 should tend to be large whereas the designs of T6/T3, T6/G12, T6/T1, T5/T1, T5/(G45+G56), and T5/T3 should tend to be small. Better arrangement may be achieved when these relationships are satisfied. Preferably, 1.25≤Gaa/T5≤5.0; 0.4≤T6/T3≤1.5; 0.8≤T6/G12≤7.0; 0.6≤T6/T1≤2.6; 5.0≤ALT/T5≤15.0; 0.2≤T5/T1≤2.1; 0.3≤T5/(G45+G56)≤2.7; and 0.3≤T5/T3≤1.05.

2. ALT/G12≤30; (G23+G34)/G12≤4.8; and (G34+G56)/G12≤5.0. the lens elements 3 and 4 should be wide enough to facilitate increasing in field of view of the imaging lens 10. The designs of ALT, G23, G34 and G56 should tend to be small for facilitating reduction of the system length of the imaging lens 10. Better arrangement may be achieved when these relationships are satisfied. Preferably, 5.0≤ALT/G12≤30.0; 0.4≤(G23+G34)/G12≤4.8; and 0.6≤(G34+G56)/G12≤5.0.

3. T3/T4≥1.7; (G23+G34)/T4≤1.5; T2/(G45+G56)≤3.0; and Gaa/(G23+G34)≥2.0. Ratios among T2, T3, T4, G23, G34, G45, G56, and Gaa should be proper to avoid any one of these parameters being too large, resulting in a long system length of the imaging lens 10, and/or to avoid any one of these parameters being too small, resulting in difficulty in manufacturing the imaging lens 10. Better arrangement may be achieved when these relationships are satisfied. Preferably, 1.7≤T3/T4≤3.0; 1.4≤(G23+G34)/T4≤1.5; 0.7≤T2/(G45+G56)≤3.0; and 2.0≤Gaa/(G23+G34)≤5.0.

To sum up, effects and advantages of the imaging lens 10 according to the present invention are described hereinafter.

1. The design of the first lens element 3 that has a negative refractive power increases field of view of the imaging lens 10 and the design of the third lens element 5 that has a positive refractive power provides sufficient refractive power to the imaging lens 10. Further, by virtue of the convex portion 311 and the convex portion 312 that collect light for imaging, the convex portion 422, the convex portion 522, the concave portion 612, the concave portion 712, the concave portion 821, and the convex portion 822, optical aberration may be corrected, thereby ensuring imaging quality of the imaging lens 10.

2. Through design of the relevant optical parameters, optical aberrations, such as spherical aberration, may be reduced or even eliminated. Further, through surface design and arrangement of the lens elements 3-8, even with the reduced system length, optical aberrations may still be reduced or even eliminated, resulting in relatively good optical performance.

3. Through the aforesaid eight preferred embodiments, it is known that the system length of this invention may be reduced down to below 6.1 mm, so as to facilitate developing thinner relevant products with economic benefits.

Figure 36:
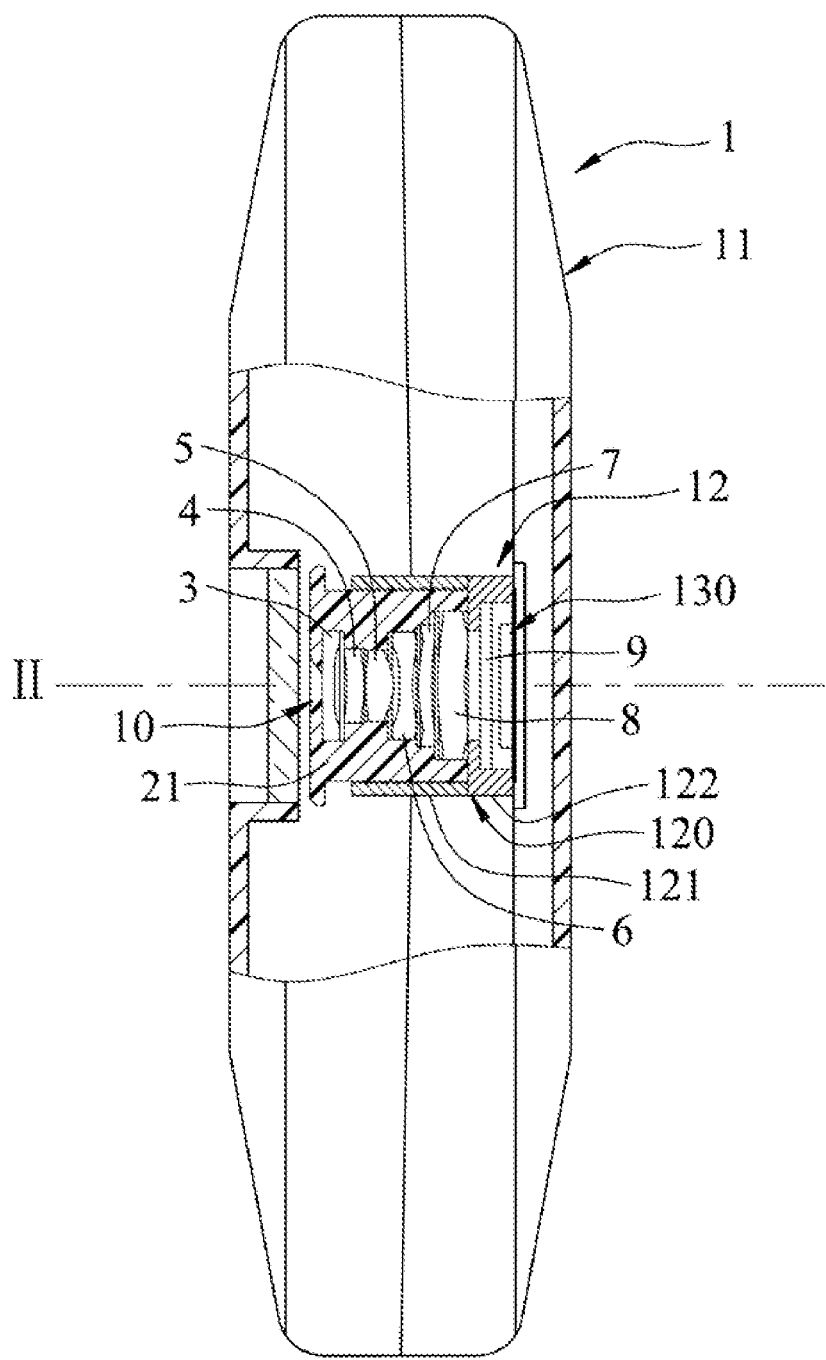
FIG. 36 is a schematic partly sectional view to illustrate a first exemplary application of the imaging lens of the present invention.

Shown in FIG. 36 is a first exemplary application of the imaging lens 10 of this invention, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 37:
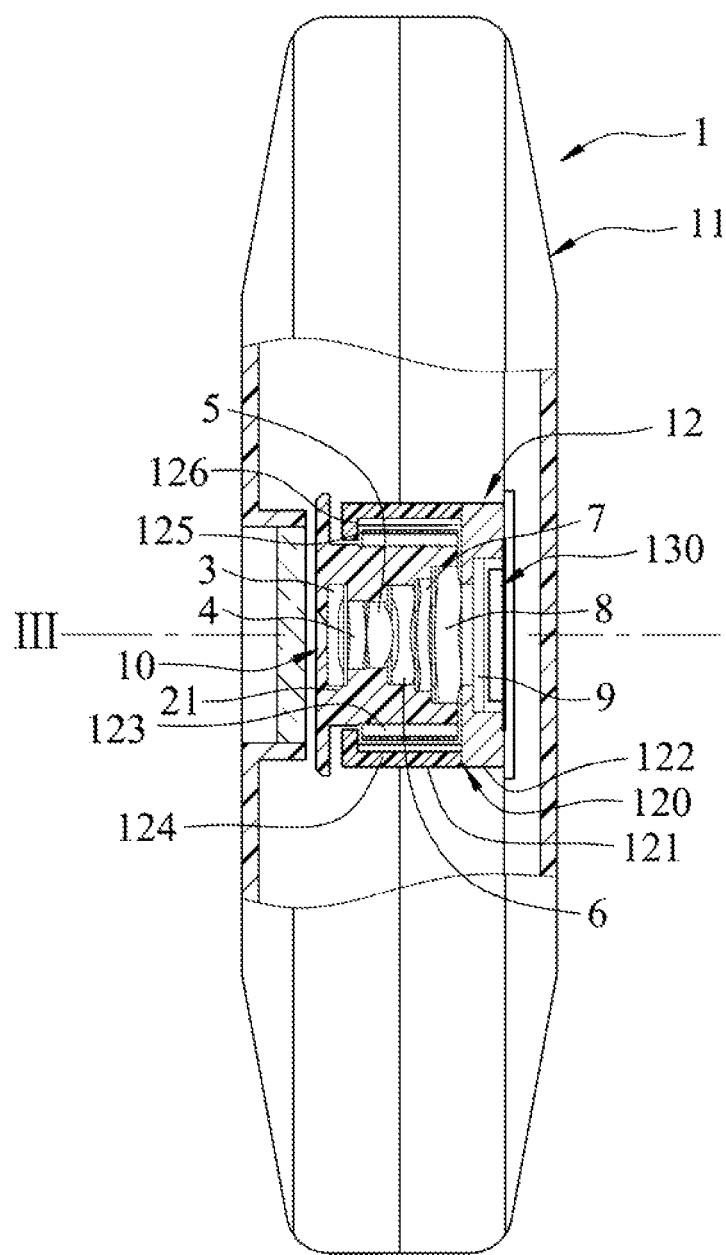
FIG. 37 is a schematic partly sectional view to illustrate a second exemplary application of the imaging lens of the present invention.

Shown in FIG. 37 is a second exemplary application of the imaging lens 10 of this invention. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (1) of the imaging lens 10. The optical filter 9 of the imaging lens 10 disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising, a first lens element, a second lens element, a third lens element, a fourth lens element, a fifth lens element and a sixth lens element arranged in order from an object side to an image side along an optical axis of said imaging lens, each of said first lens element, said second lens element, said third lens element, said fourth lens element, said fifth lens element and said sixth lens element having a refractive power, an object-side surface facing toward the object side, and an image-side surface facing toward the image side, wherein:

said first lens element has a negative refractive power, said object-side surface of said first lens element is a convex surface that has a convex portion in a vicinity of the optical axis and a convex portion in a vicinity of a periphery of said first lens element;

said image-side surface of said second lens element has a convex portion in a vicinity of a periphery of said second lens element;

said third lens element has a positive refractive power and said image-side surface of said third lens element has a convex portion in a vicinity of a periphery of said third lens element;

said object-side surface of said fourth lens element has a concave portion in a vicinity of a periphery of said fourth lens element;

said object-side surface of said fifth lens element has a concave portion in a vicinity of a periphery of said fifth lens element, said image-side surface of said fifth lens element has a concave portion in a vicinity of the optical axis;

said image-side surface of said sixth lens element has a concave portion in a vicinity of the optical axis and a convex portion in a vicinity of a periphery of said sixth lens element;

said imaging lens does not include any lens element with refractive power other than said first lens element, said second lens element, said third lens element, said fourth lens element, said fifth lens element and said sixth lens element; and said imaging lens further satisfying $T3/T4 \geq 1.7$, where $T3$ represents a thickness of said third lens element at the optical axis and $T4$ represents a thickness of said fourth lens element at the optical axis.

2. The imaging lens as claimed in claim 1, satisfying $Gaa/T5 \geq 1.25$, where $Gaa$ represents a sum of air gap widths among said first lens element, said second lens element, said third lens element, said fourth lens element, said fifth lens element and said sixth lens element at the optical axis, and $T5$ represents a thickness of said fifth lens element at the optical axis.

3. The imaging lens as claimed in claim 2, further satisfying $T6/T1 \leq 2.6$, where $T1$ represents a thickness of said first lens element at the optical axis and $T6$ represents a thickness of said sixth lens element at the optical axis.

4. The imaging lens as claimed in claim 2, further satisfying $(G34+G56)/G12 \leq 5.0$, where $G12$ represents an air gap width between said first lens element and said second lens element at the optical axis, $G34$ represents an air gap width between said third lens element and said fourth lens element at the optical axis, and $G56$ represents an air gap width between said fifth lens element and said sixth lens element at the optical axis.

5. The imaging lens as claimed in claim 1, satisfying $T6/T3 \leq 1.5$, where $T6$ represents a thickness of said sixth lens element at the optical axis.

6. The imaging lens as claimed in claim 5, further satisfying $ALT/T5 \geq 5.0$, where $ALT$ represents a sum of thicknesses of said first lens element, said second lens element, said third lens element, said fourth lens element, said fifth lens element and said sixth lens element at the optical axis, and $T5$ represents a thickness of said fifth lens element at the optical axis.

7. The imaging lens as claimed in claim 1, satisfying $ALT/G12 \leq 30$, where $ALT$ represents a sum of thicknesses of said first lens element, said second lens element, said third lens element, said fourth lens element, said fifth lens element and said sixth lens element at the optical axis, and $G12$ represents an air gap width between said first lens element and said second lens element at the optical axis, and said image-side surface of said fifth lens element has a concave portion in a vicinity of the optical axis.

8. The imaging lens as claimed in claim 7, further satisfying $(G23+G34)/T4 \leq 1.5$, where $G23$ represents an air gap width between said second lens element and said third lens element at the optical axis, $G34$ represents an air gap width between said third lens element and said fourth lens element at the optical axis.

9. The imaging lens as claimed in claim 7, further satisfying $T2/(G45+G56) \leq 3.0$, where $G45$ represents an air gap width between said fourth lens element and said fifth lens element at the optical axis, G56 represents an air gap width between said fifth lens element and said sixth lens element at the optical axis, and T2 represents a thickness of said second lens element at the optical axis.

10. The imaging lens as claimed in claim 1, satisfying T6/G12≤7.0, where T6 represents a thickness of said sixth lens element at the optical axis and G12 represents an air gap width between said first lens element and said second lens element at the optical axis.

11. The imaging lens as claimed in claim 10, further satisfying T5/T1≤2.1, where T1 represents a thickness of said first lens element at the optical axis and T5 represents a thickness of said fifth lens element at the optical axis.

12. The imaging lens as claimed in claim 10, further satisfying Gaa/(G23+G34)≥2.0, where Gaa represents a sum of air gap widths among said first lens element, said second lens element, said third lens element, said fourth lens element, said fifth lens element and said sixth lens element at the optical axis, G23 represents an air gap width between said second lens element and said third lens element at the optical axis, and G34 represents an air gap width between said third lens element and said fourth lens element at the optical axis.

13. The imaging lens as claimed in claim 1, satisfying (G23+G34)/G12≤4.8, where G12 represents an air gap width between said first lens element and said second lens element at the optical axis, G23 represents an air gap width between said second lens element and said third lens element at the optical axis, and G34 represents an air gap width between said third lens element and said fourth lens element at the optical axis.

14. The imaging lens as claimed in claim 13, further satisfying T5/(G45+G56)≤2.7, where T5 represents a thickness of said fifth lens element at the optical axis, G45 represents an air gap width between said fourth lens element and said fifth lens element at the optical axis, and G56 represents an air gap width between said fifth lens element and said sixth lens element at the optical axis.

15. The imaging lens as claimed in claim 13, further satisfying T5/T3≤1.05, where—T5 represents a thickness of said fifth lens element at the optical axis.

16. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

17. The imaging lens as claimed in claim 1, wherein said object-side surface of said third lens element has a convex portion in a vicinity of a periphery of said third lens element.

18. The imaging lens as claimed in claim 1, wherein said image-side surface of said fourth lens element has a concave portion in a vicinity of the optical axis.

\* \* \* \* \*